(12) United States Patent
Hara

(10) Patent No.: US 12,045,520 B2
(45) Date of Patent: Jul. 23, 2024

(54) DISPLAY CONTROL DEVICE, METHOD, AND PROGRAM PRODUCT FOR DISTINGUISHABLY DISPLAYING PRINTING PROCESSES AND SUBDIVIDED PROCESSES BEING EXECUTED

(71) Applicant: SEIKO EPSON CORPORATION, Tokyo (JP)

(72) Inventor: Ryota Hara, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/457,527

(22) Filed: Aug. 29, 2023

(65) Prior Publication Data
US 2024/0069821 A1    Feb. 29, 2024

(30) Foreign Application Priority Data

Aug. 29, 2022   (JP) ................................. 2022-135662

(51) Int. Cl.
*G06F 3/12*     (2006.01)
*H04N 1/00*    (2006.01)

(52) U.S. Cl.
CPC ............ *G06F 3/1207* (2013.01); *G06F 3/121* (2013.01); *G06F 3/1259* (2013.01); *G06F 3/1288* (2013.01); *H04N 1/00477* (2013.01)

(58) Field of Classification Search
CPC ...... G06F 3/1207; G06F 3/121; G06F 3/1259; G06F 3/1288; H04N 1/00477
See application file for complete search history.

(56) References Cited

U.S. PATENT DOCUMENTS

| | | | |
|---|---|---|---|
| 11,762,605 B2 * | 9/2023 | Minamihara | G06F 3/1259 358/296 |
| 11,836,408 B2 * | 12/2023 | Fukuchi | G06F 3/1263 |
| 11,907,598 B2 * | 2/2024 | Fukuchi | G06F 3/1256 |
| 2012/0224224 A1 * | 9/2012 | Furumoto | G06K 15/005 358/1.15 |
| 2016/0179447 A1 | 6/2016 | Ochi et al. | |
| 2023/0053705 A1 * | 2/2023 | Fukuchi | G06F 3/1267 |
| 2023/0058455 A1 * | 2/2023 | Fukuchi | G06F 3/1275 |
| 2023/0059926 A1 * | 2/2023 | Minamihara | G06F 3/1285 |
| 2023/0060094 A1 * | 2/2023 | Fukuchi | G06F 3/0486 |

FOREIGN PATENT DOCUMENTS

JP    2018185869 A    11/2018

* cited by examiner

*Primary Examiner* — Scott A Rogers
(74) *Attorney, Agent, or Firm* — Pramod Chintalapoodi

(57) ABSTRACT

A display control device includes a progress acquirer that acquires progress of a plurality of processes for generating print products, a subdivision progress acquirer that acquires, in at least one of the plurality of processes, progress of subdivided processes obtained by subdividing the process, a process display that displays the plurality of processes on a display device so that at least one of the processes being executed is distinguishable, and a subdivided process display that displays the subdivided processes on the display device so that at least one of the subdivided processes being executed is distinguishable.

17 Claims, 12 Drawing Sheets

FIG. 6

| PRODUCT INFORMATION | |
|---|---|
| FILE NAME | FILEA.PDF |
| THE NUMBER OF DELIVERIES | 7 |
| PRINT JOB LIST | PRINT JOB 1 |
| | PRINT JOB 2 |
| | PRINT JOB 3 |

| PRINT JOB INFORMATION | | |
|---|---|---|
| PRINT JOB 1 | PRINT SETTINGS | COLOR SIZE: A1 |
| | PROCESS BEING EXECUTED | WAITING FOR START OF PRINTING |
| | SUBDIVIDED PROCESS BEING EXECUTED | DATA TRANSMISSION |
| | THE NUMBER OF COPIES | 2 |
| PRINT JOB 2 | PRINT SETTINGS | SAMPLE COLOR A COLOR SIZE: A2 |
| | PROCESS BEING EXECUTED | COLOR ADJUSTMENT |
| | SUBDIVIDED PROCESS BEING EXECUTED | - |
| | THE NUMBER OF COPIES | 3 |
| PRINT JOB 3 | PRINT SETTINGS | BLACK AND WHITE SIZE: A1 |
| | PROCESS BEING EXECUTED | WAITING FOR START OF PRINTING |
| | SUBDIVIDED PROCESS BEING EXECUTED | IMAGE PROCESSING COMPLETION |
| | THE NUMBER OF COPIES | 2 |

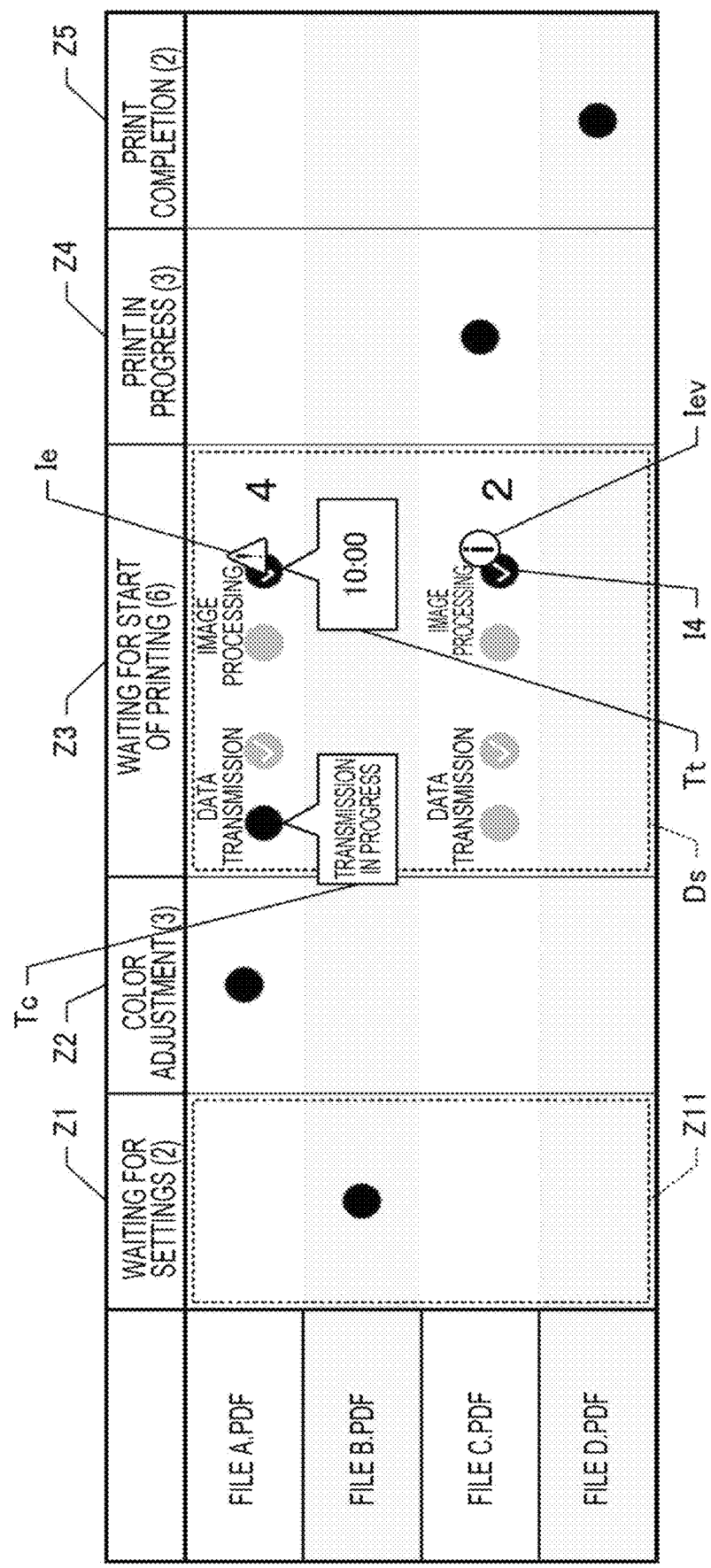

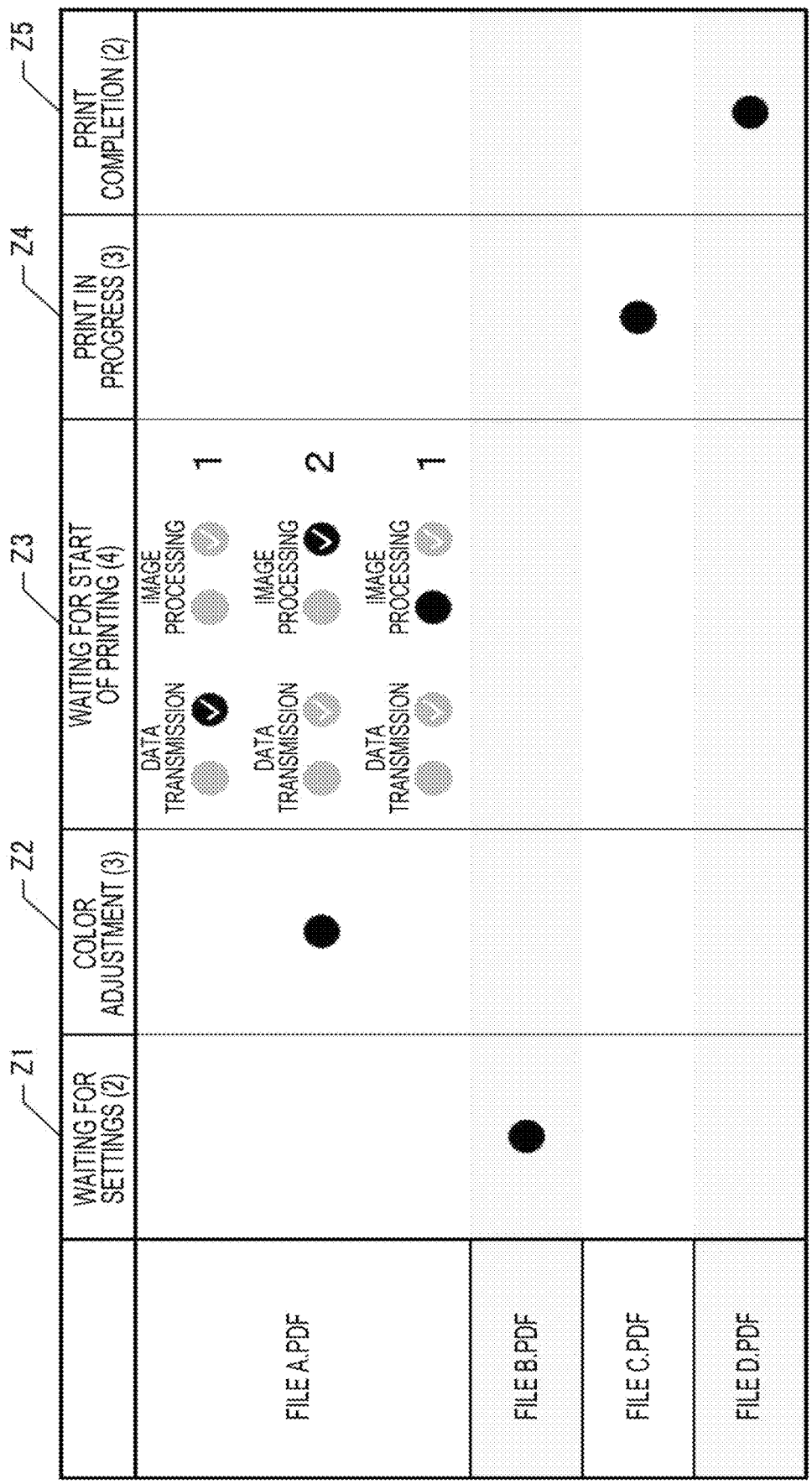

DISPLAY CONTROL DEVICE, METHOD, AND PROGRAM PRODUCT FOR DISTINGUISHABLY DISPLAYING PRINTING PROCESSES AND SUBDIVIDED PROCESSES BEING EXECUTED

The present application is based on, and claims priority from JP Application Serial Number 2022-135662, filed Aug. 29, 2022, the disclosure of which is hereby incorporated by reference herein in its entirety.

BACKGROUND

1. Technical Field

The present disclosure relates to a display control device, a display control method, and a non-transitory computer-readable storage medium storing a display control program.

2. Related Art

In general, a technique of notifying a server of a status, such as an error that has occurred in a printer, has been used.

In the general technique, progress of a print process is not notified in detail, and therefore, a user may not recognize progress state of the print process in detail (see JP-A-2018-185869).

SUMMARY

According to an aspect of the present disclosure, a display control device includes a progress acquirer that acquires progress of a plurality of processes for generating print products, a subdivision progress acquirer that acquires, in at least one of the plurality of processes, progress of subdivided processes obtained by subdividing the process, a process display that displays the plurality of processes on a display device so that at least one of the processes being executed is distinguishable, and a subdivided process display that displays the subdivided processes on the display device so that at least one of the subdivided processes being executed is distinguishable.

According to another aspect of the present disclosure, a display control method includes acquiring progress of a plurality of processes for generating print products, acquiring, in at least one of the plurality of processes, progress of subdivided processes obtained by subdividing the process, displaying the plurality of processes on a display device so that at least one of the processes being executed is distinguishable, and displaying the subdivided processes on the display device so that at least one of the subdivided processes being executed is distinguishable.

According to a further aspect of the present disclosure, a non-transitory computer-readable storage medium storing a display control program that causes a computer to function as a progress acquirer that acquires progress of a plurality of processes for generating print products, a subdivision progress acquirer that acquires, in at least one of the plurality of processes, progress of subdivided processes obtained by subdividing the process, a process display that displays the plurality of processes on a display device so that at least one of the processes being executed is distinguishable, and a subdivided process display that displays the subdivided processes on the display device so that at least one of the subdivided processes being executed is distinguishable.

BRIEF DESCRIPTION OF THE DRAWINGS

FIG. 6 is a diagram illustrating an example of product information.

FIG. 12 is a diagram illustrating an example of display of the subdivided process display screen.

FIG. 13 is a diagram illustrating an example of display of the subdivided process display screen.

DESCRIPTION OF EMBODIMENTS

Hereinafter, embodiments of the present disclosure will be described in the following order.

1 System Configuration
1-1 Server Configuration
1-2 Terminal Configuration
1-3 Computer Configuration
1-4 Printer Configuration
2 Process Management
3 Display Control Process
4 Other Embodiments

1 System Configuration

Figure 1:
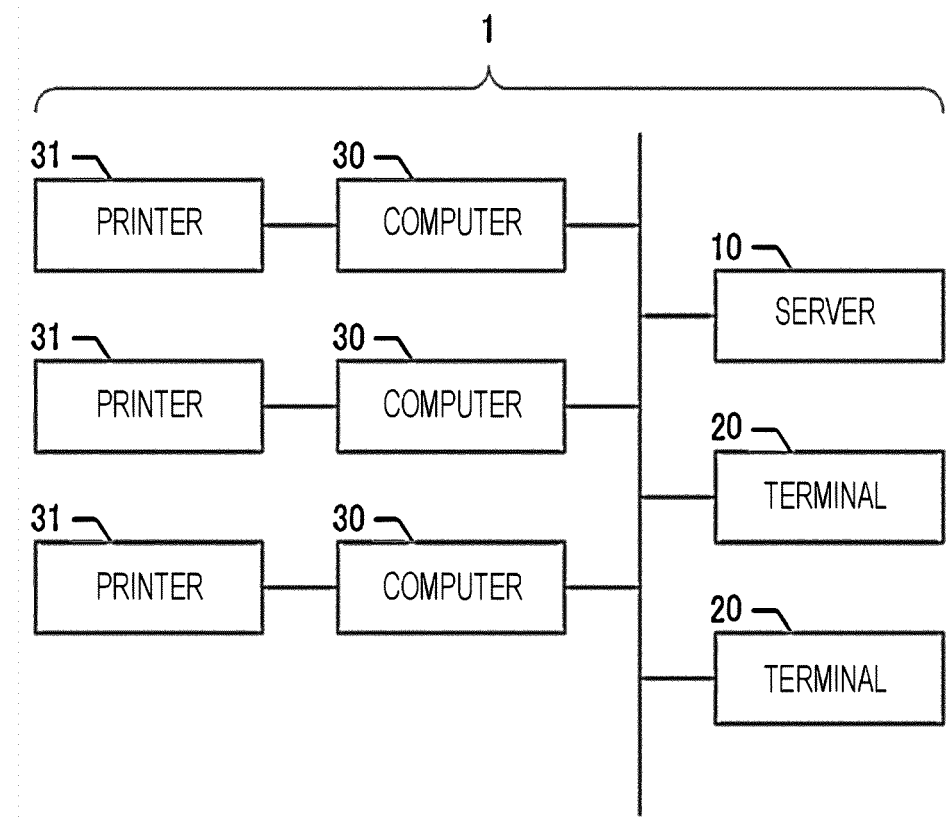
FIG. 1 is a diagram schematically illustrating an example of a production system.

FIG. 1 is a diagram schematically illustrating an example of a production system according to the present disclosure. A production system 1 includes a server 10, a terminal 20, a computer 30, and a printer 31. The numbers of devices illustrated in the figure are merely examples and are not limited. For example, the number of terminals 20, the number of computers 30, and the number of printers 31 illustrated in FIG. 1 are not limited to the numbers illustrated in FIG. 1, and the number of servers 10 illustrated in FIG. 1 may be multiple. These devices may communicate with one another via a network. The network may be in various forms, and may be a local network, or devices that are physically separated from one another may communicate with one another via the Internet or other means.

In this embodiment, a user who performs production management and production work accepts a request for production of print products from a requester. The user operates the terminal 20 so as to enter information indicating content of the request. The terminal 20 transmits the information to the server 10. The server 10 controls the computer 30 and the printer 31 to perform the requested production.

In the production system 1 according to this embodiment, printing may be performed based on arbitrary print data indicating a print target, and the arbitrary number of print products are produced based on the print data constituted by a single file. In other words, the requested number of print products with contents that meet requirements of the requester who requests the production of the print products may be produced. Furthermore, in this embodiment, different print products may be produced based on the print data constituted by a single file. For example, when the same image is printed on different sizes of print media, different print products are produced based on the print data constituted by a single file. The following is a description of a configuration of each device in the production system 1 capable of producing such print products.

1-1 Server Configuration

Figure 2:
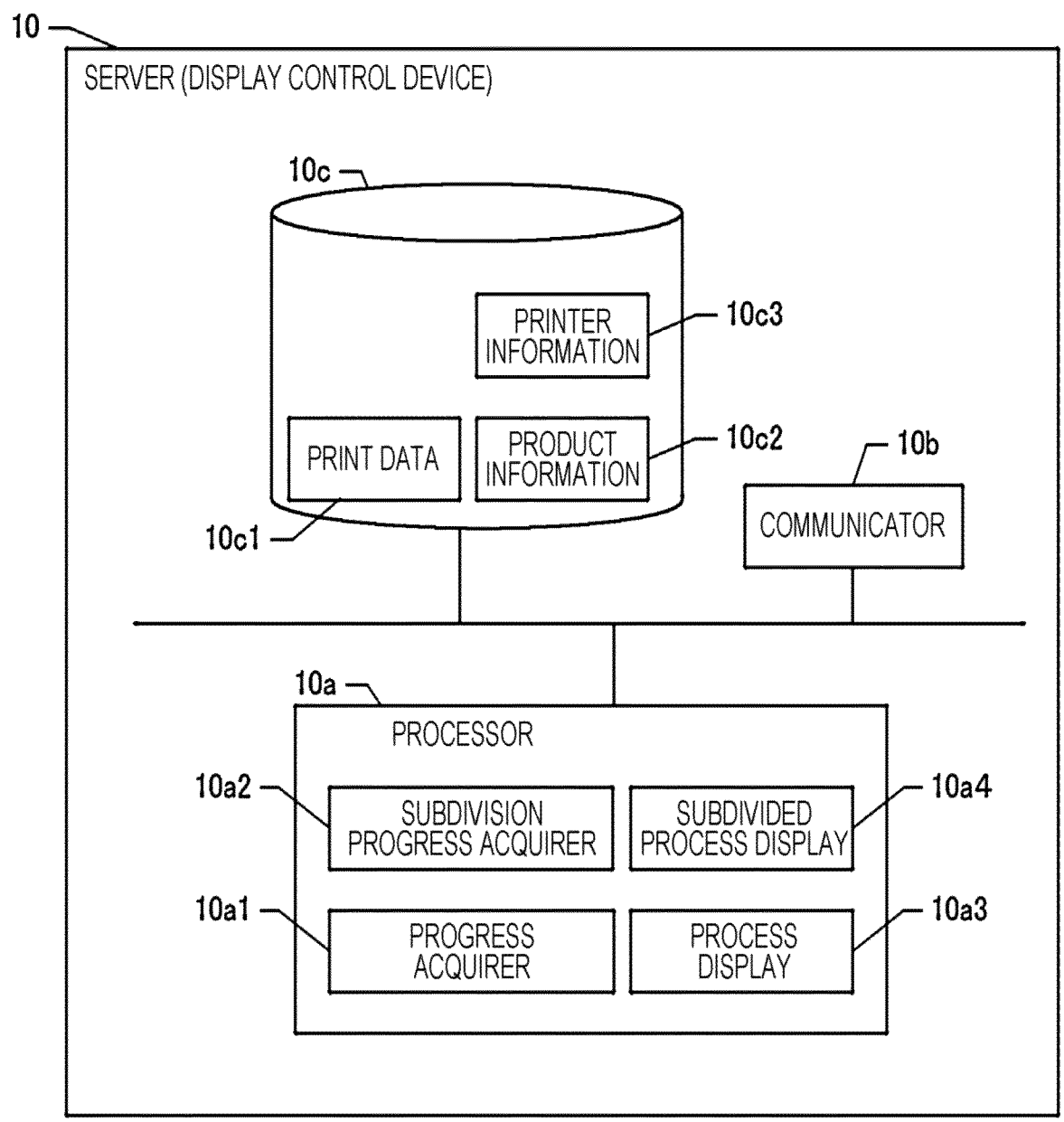
FIG. 2 is a block diagram illustrating a configuration of a server.

FIG. 2 is a block diagram illustrating a configuration of the server 10. In this embodiment, the server 10 functions as a display control device. The server 10 has a processor 10*a*, a communicator 10*b*, and a nonvolatile memory 10*c*. The processor 10*a* includes a CPU, a ROM, a RAM, etc., not shown in the figure, and may execute various programs stored in the nonvolatile memory 10*c* to control the individual components of the server 10 and individual devices connected to the network. Note that the processor 10*a* may be constituted by a single chip or a plurality of chips, or may be configured as an SoC together with various functional blocks that operate a printer. Furthermore, an ASIC may be employed instead of the CPU or the CPU and the ASIC may cooperate with each other, for example. When each of the devices in this embodiment includes a processor, the processor may be realized in various ways similarly to the processor 10*a*.

The communicator 10*b* includes a communication interface used to perform communication with an external apparatus in accordance with various wired or wireless communication protocols. The server 10 may communicate with the other devices via the communicator 10*b*. Note that the communicator 10*b* may include an interface for communicating with various removable memories attached to the server 10.

The nonvolatile memory 10*c* stores various types of information. For example, the nonvolatile memory 10*c* stores print data 10*c*1 that represents a print product. The print data 10*c*1 is a file that includes data indicating content to be printed on a print medium, and may be a pdf file, etc.

Furthermore, the nonvolatile memory 10*c* stores product information 10*c*2 indicating a print product to be produced based on the print data 10*c*1. The product information 10*c*2 includes a file name for printing of a print product, the number of copies of the print product, a print job to be executed based on the print data, and information indicating progress of a process. Of course, the product information 10*c*2 may include other information, such as information on a delivery date or information on a client. The product information 10*c*2 will be described below in detail.

Furthermore, printer information 10*c*3 is stored in the nonvolatile memory 10*c*. The printer information 10*c*3 holds information on current states and other information about the plurality of printers to be used in the production of print products. Specifically, the printer information 10*c*3 includes identification information of the computers 30 and the printers 31, identification information of print jobs assigned to the printers 31, and information indicating states of the printers 31 (an error, etc.). A plurality of print jobs may be assigned to a single printer 31, and therefore, when a plurality of print jobs are assigned to a single printer 31, information indicating the print order of the print jobs is associated with the identification information of the print jobs.

The processor 10*a* manages the progress of the process and controls display of the progress of the process based on the information stored in the nonvolatile memory 10*c* as described above. The management of the progress of the process is performed to assign the print jobs generated using the print data 10*c*1 to the printers 31 and cause the printers 31 to perform printing to produce print products. The progress management will be described below in detail. When the progress management is performed, information indicating a process being executed is stored in the product information 10*c*2. The processor 10*a* controls the display of the progress of the process based on the information indicating the process being executed.

Therefore, a program not shown is stored in the nonvolatile memory 10*c*, and when the program is executed, the processor 10*a* functions as a progress acquirer 10*a*1, a subdivision progress acquirer 10*a*2, a process display 10*a*3, and a subdivided process display 10*a*4.

The progress acquirer 10*a*1 has a function of acquiring progress of a plurality of processes for a print product produced through the processes. In other words, the processor 10*a* refers to the product information 10*c*2 to acquire a process being executed in processes for producing a print product. In this embodiment, the plurality of processes are a process of waiting for a setting of print conditions, a process of adjusting colors of print products, a process of waiting for a start of printing, a print-in-progress process, and a print completion process. The acquisition of the progress of the processes will be described below in detail.

The subdivision progress acquirer 10*a*2 has a function of acquiring progress of subdivided processes obtained by subdividing at least one of the plurality of processes. In this embodiment, the process of waiting for a start of printing is subdivided in advance. The process of waiting for a start of printing is performed between completion of print preparation in a print job and a start of printing by the printer 31. In this embodiment, the print data 10*c*1 indicating print content in the print job is stored in the nonvolatile memory 10*c* of the server 10, and therefore, the print data 10*c*l is required to be transmitted to the computer 30 to start printing by the printer 31. Furthermore, the computer 30 is required to execute image processing based on the print data 10*c*l so as to generate print job data in a format capable of performing printing by the printer 31.

Therefore, according to this embodiment, two subdivided processes, that is, a process during data transmission and a process of transmission completion, are defined as processes associated with transmission of the print data 10*c*1 from the nonvolatile memory 10*c* to the computer 30. Furthermore, two subdivided processes, that is, a process during image processing and a process of image processing completion, are defined as processes associated with the image processing based on the print data 10*c*1 in the computer 30. The processor 10*a* refers to the product information 10*c*2 so as to obtain at least one of the subdivided processes that is being executed. Acquisition of progress of the subdivided processes will be described below in detail.

Specifically, the process display 10*a*3 has a function of displaying a plurality of processes on a display device in a manner that a process being executed may be identified. In other words, the processor 10*a* identifies a process being executed based on the product information 10*c*2 and transmits information for displaying the process being executed to the terminal 20 via the communicator 10*b*. As a result, in the terminal 20, the plurality of processes are displayed on a display in a manner that a process being executed is distinguishable. The display control of progress of a process will be described below in detail.

The subdivided process display 10*a*4 has a function of displaying the subdivided processes on the display device in a manner that a subdivided process being executed is distinguishable. In other words, the processor 10a identifies a subdivided process being executed based on the product information 10c2 and transmits information for displaying the subdivided process being executed to the terminal 20 via the communicator 10b. As a result, in the terminal 20, the plurality of subdivided processes are displayed on the display in a manner that the subdivided process being executed is distinguishable. The display control of progress of the subdivided processes will be described below in detail.

1-2 Terminal Configuration

Figure 3:
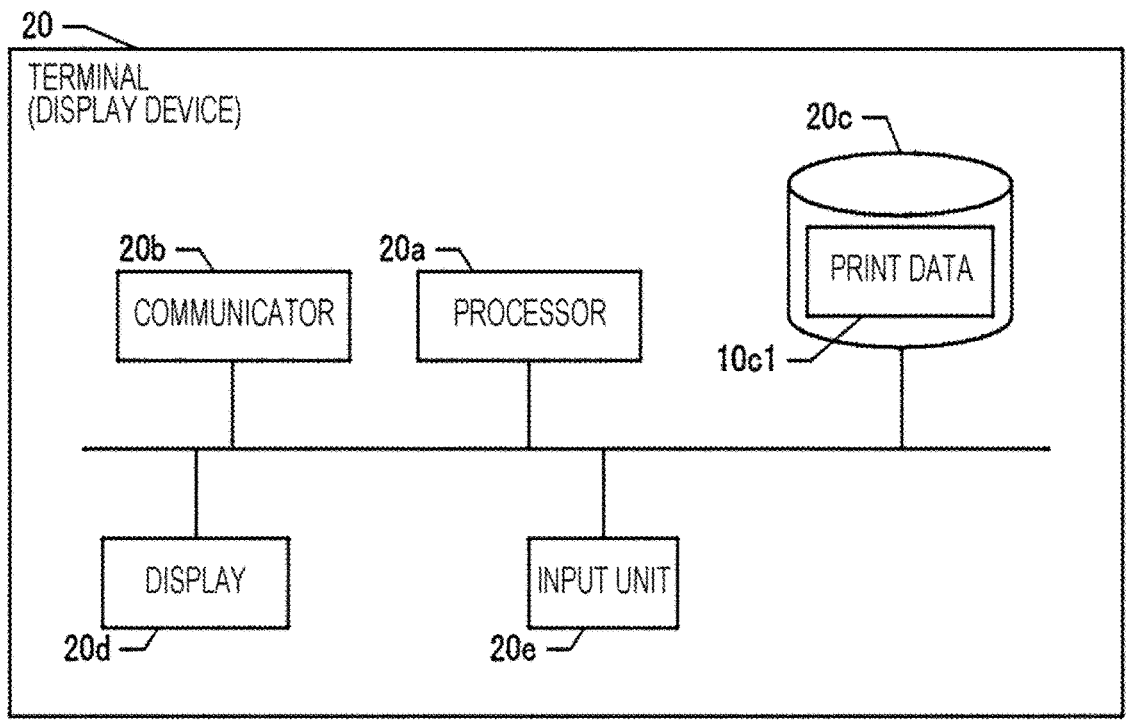
FIG. 3 is a block diagram illustrating a configuration of a terminal.

FIG. 3 is a block diagram illustrating a configuration of the terminal 20. The terminal 20 includes a processor 20a, a communicator 20b, a nonvolatile memory 20c, a display 20d, and an input unit 20e. The processor 20a includes a CPU, a ROM, and a RAM, not illustrated, and controls the components included in the terminal 20 by executing various programs recorded in the nonvolatile memory 20c.

The communicator 20b includes a communication interface used to perform communication with an external apparatus in accordance with various wired or wireless communication protocols. The terminal 20 is capable of communicating with other devices through the communicator 20b. Furthermore, the communicator 20b includes an interface for communicating with various removable memories attached to the terminal 20.

Various types of data are stored in the nonvolatile memory 20c of the terminal 20. For example, before being transferred to the server 10, the print data 10c1 indicating a print product requested for production is stored in the nonvolatile memory 20c. Furthermore, information required for displaying progress of a process is stored in the nonvolatile memory 20c. Note that various modes may be employed as a mode for preparing the print data 10c1, and for example, the user may generate the print data 10c1 using an application program or the like by means of the terminal 20 and stores the print data 10c1 in the nonvolatile memory 20c. Alternatively, the print data 10c1 transferred from another nonvolatile memory via the communicator 20b may be stored in the nonvolatile memory 20c.

The display 20d is a display device that displays arbitrary images. The input unit 20e is a device used by a user performing an input operation, and constituted by, for example, a keyboard, a mouse, a touch panel, etc. The user may operate the input unit 20e to input user intentions while viewing images and text displayed on the display 20d. In this embodiment, the user may use the display 20d and the input unit 20e of the terminal 20 as the user interface to designate the print data 10c1 to be requested, enter print settings, designate sample colors, and so on. The designation of the sample colors may be performed using a colorimeter or a similar device.

Furthermore, the processor 20a displays a process management screen on the display 20d to display progress of a process of print products for the user to view. In this sense, the terminal 20 constitutes the display device in this embodiment. In this embodiment, the processor 20a displays processes in chronological order for each print data on the process management screen. Furthermore, when a print job belongs to the process of waiting for a start of printing, the processor 20a displays the subdivided processes in chronological order on the process management screen.

1-3 Computer Configuration

Figure 4:
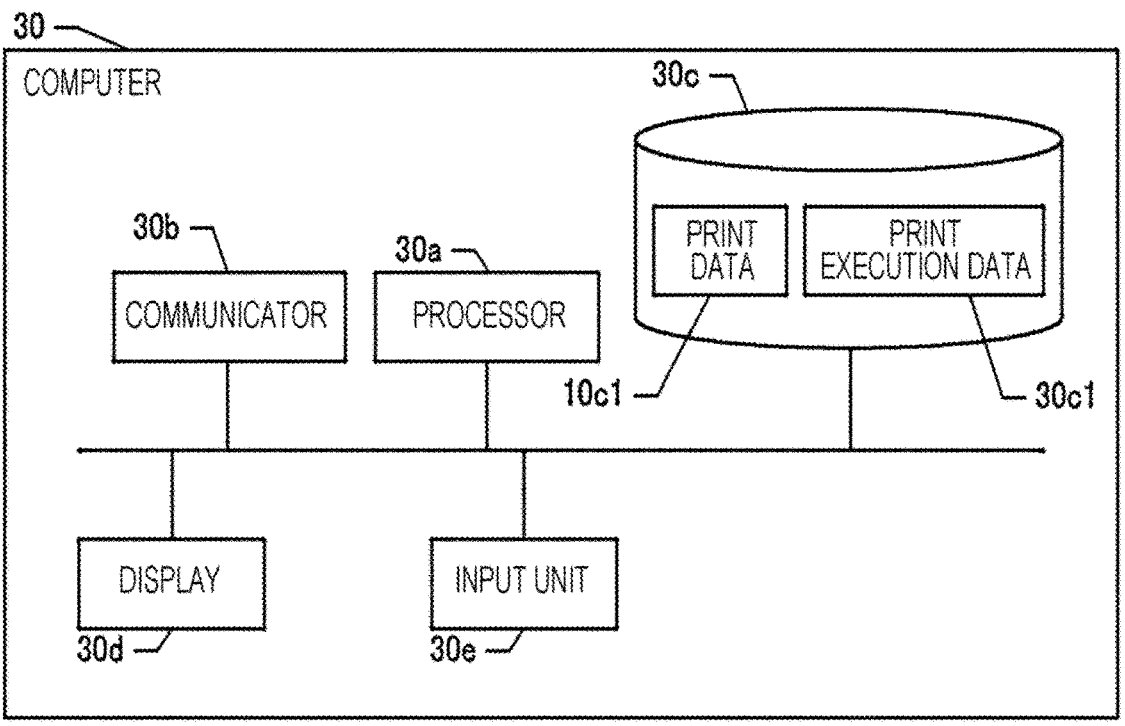
FIG. 4 is a block diagram illustrating a configuration of a computer.

FIG. 4 is a block diagram illustrating a configuration of the computer 30. The computer 30 includes a processor 30a, a communicator 30b, a nonvolatile memory 30c, a display 30d, and an input unit 30e. The processor 30a includes a CPU, a ROM, and a RAM, not illustrated, and controls the components included in the computer 30 by executing various programs recorded in the nonvolatile memory 30c.

The communicator 30b includes a communication interface used to perform communication with an external apparatus in accordance with various wired or wireless communication protocols. The computer 30 may communicate with the server 10 and the printer 31 via the communicator 30b to exchange arbitrary information.

The nonvolatile memory 30c is capable of storing various types of information. In this embodiment, the nonvolatile memory 30c is capable of storing the print data 10c1 for a print job transmitted from the server 10. The display 30d displays various types of information. The input unit 30e is a mouse, keyboard, or other devices that is capable of accepting various inputs by the user.

In this embodiment, a plurality of computers 30 are installed in a facility owned by a printing company, and the printers 31 are connected to respective computers 30. The computers 30 control the corresponding printers 31 to execute printing, and therefore, in this embodiment, the computers 30 and the printers 31 constitute print devices. The print devices may be in various forms, and a plurality of printers 31 may be connected to one computer 30, or a plurality of computers 30 may be connected to one printer 31. Furthermore, the printers 31 may communicate with the server 10 without using the computers 30, and image processing and other operations may be performed by the processors included in the printers 31.

The server 10 determines one of the printers 31 that executes a print job generated based on the print data 10c1 and transmits the print data 10c1 to a corresponding one of the computers 30 that controls the printer 31. Furthermore, when a plurality of print jobs are to be executed on the same printer 31, the server 10 determines the print order of the print jobs. For this reason, information indicating the print order is associated with the print data 10c1 transmitted from the server 10. Furthermore, in this embodiment, the print data 10c1 is a pdf file, etc., as described above, and image processing is required to execute printing by the printer 31. For this reason, the print data 10c1 is associated with information indicating the print job, such as print conditions indicating colors to be used, a size of a medium, etc., and information indicating a portion designated as a sample color and its color (a Lab value, etc.)

In this embodiment, when the server 10 starts transmission of the print data 10c1 for a print job, the processor 30a obtains the print data 10c1 via the communicator 30b and stores the print data 10c1 in the nonvolatile memory 30c. After the print data 10c1 is stored, the processor 30a performs image processing based on the print data 10c1 to generate print execution data 30c1. The print execution data 30c1 is described in a form that enables the printer 31 to execute printing based on the print execution data 30c1, and is, for example, described in a page description language. Specifically, the processor 30a performs image processing to perform printing in accordance with the print conditions and the sample colors based on the information indicating the print job so as to convert the print data 10c1, such as a pdf file, and generate a raster image representing print content. The processor 30a then generates the print execution data 30c1 to print the raster image and stores the print execution data 30c1 in the nonvolatile memory 30c. Note that, when a plurality of print data 10c1 that have not been subjected to the image processing are stored in the nonvolatile memory 30c, the processor 30a executes the image processing on the print data 10c1 corresponding to the earlier print order.

After the print execution data 30c1 is generated, the processor 30a transmits the print execution data 30c1 to the printer 31 via the communicator 30b to execute printing. Specifically, the computer 30 may obtain a state of the printer 31 via the communicator 30b. When the printer 31 is in the standby state or when a print-in-progress state is changed to a print completion state, the processor 30a determines that the printer 31 is available for printing. In this case, the processor 30a refers to the information indicating the print order associated with the print data 10c1 and transmits the print execution data 30c1 generated using the print data 10c1 of the earliest print order to the printer 31. By this process, the print jobs are printed according to the print order. Note that the state of the printer 31 is also transferred to the server 10, and when the server 10 receives the state of the printer 31, the printer information 10c3 is updated. In other words, the processor 10a performs a process of updating information indicating the state, such as deletion of a print job that have finished or reflection of a change in the state of the printer 31.

1-4 Printer Configuration

Figure 5:
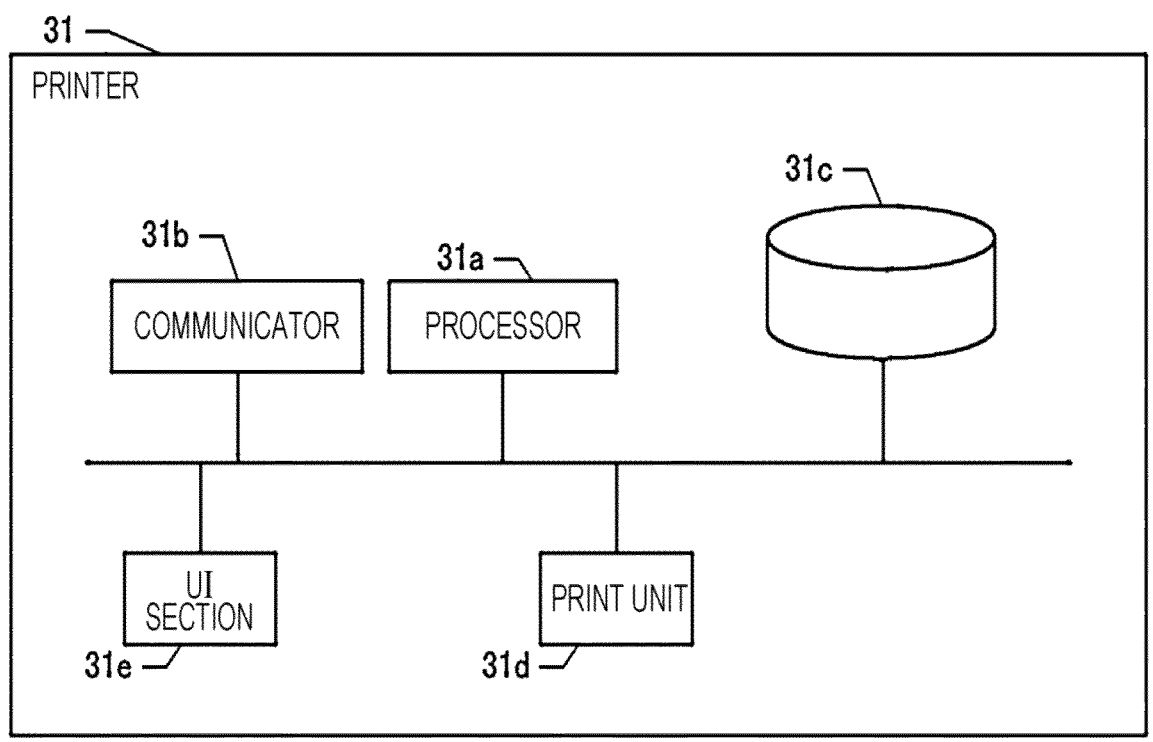
FIG. 5 is a block diagram illustrating a configuration of a printer.

FIG. 5 is a diagram illustrating an example of a configuration of the printer 31. The printer 31 includes a processor 31a, a communicator 31b, a nonvolatile memory 31c, a print unit 31d, and a UI section 31e. The processor 31a includes a CPU, a ROM, and a RAM, not illustrated, and controls the sections included in the printer 31 by executing various programs recorded in the nonvolatile memory 31c.

The communicator 31b includes a communication interface used to perform communication with an external apparatus in accordance with various wired or wireless communication protocols. The printer 31 may communicate with the computer 30 via the communicator 31b. Note that the communicator 31b may include an interface for communicating with various removable memories attached to the printer 31.

The print unit 31d executes printing, and various printing methods, such as an ink-jet method and an electrophotographic method, may be employed. The print unit 31d includes actuators, various devices, sensors, drive circuits, and mechanical parts to execute printing on various media. The sensors include sensors that detect various types of detection target that may change in the printer 31. The detection targets are not limited, and the sensors include, for example, a sensor that detects an amount of remaining capacity of a medium and a sensor that detects an amount of remaining ink for each color used in printing. Detection results are supplied to the computer 30 as information indicating a state of the printer 31.

The UI section 31 includes a touch panel display, various keys, and various switches. The touch panel display includes a display panel for displaying various information, such as a status of the printer 31 and an amount of remaining ink, and a touch detection panel superposed on the display panel, and detects a touch operation performed by a human finger or the like. The processor 31a may obtain content of an operation performed by the user through the UI section 31e. Furthermore, the processor 31a may display various information on a display of the UI section 31e so as to make a notification for the user.

The processor 31a sequentially performs printing based on the print execution data 30c1 sequentially supplied from the computer 30. The computer 30 performs printing in accordance with the print order of print jobs associated with the print data 10c1 received from the server 10. When the printing is terminated, the processor 31a transmits information indicating that the printing has been terminated to the computer 30 via the communicator 31b. Therefore, the computer 30 may cause the printer 31 to start printing based on print execution data 30c1 in the next print order. Furthermore, the computer 30 transmits the information indicating that the printing has been terminated to the server 10. Therefore, the server 10 may recognize progress of a print job indicated by the server 10.

2 Process Management

As described above, the production system 1 in this embodiment involves a plurality of processes to produce print products. A plurality of print jobs for printing print products may coexist. Furthermore, a plurality of print devices operate in parallel in the situation where a plurality of print jobs coexist. Therefore, the server 10 is configured to recognize a start and an end of each process and to recognize a process being executed.

Specifically, information indicating the process being executed is recorded in the product information 10c2. FIG. 6 is a diagram illustrating an example of the produce information 10c2 in detail. The product information 10c2 is generated for each print data 10c1 and indicates a print job or the like to be executed based on each print data 10c1. In FIG. 6, an example of the product information 10c2 of print data corresponding to a name of FILEA.PDF is shown. The product information 10c2 of the print data includes information indicating the file name, the number of deliveries, and a print job list. Information other than these may be included.

When the print data 10c1 is stored in the nonvolatile memory 10c of the server 10 by the terminal 20 or the like, the processor 10a identifies the file name of the print data 10c1 and generates the product information 10c2 including the file name. The number of deliveries and the print job list are recorded in the product information 10c2 according to settings for the print data 10c1. The number of deliveries is a sum of the numbers of copies of print products printed based on the print data 10c1. When the print products are printed by a plurality of print jobs, a sum of the numbers of print products printed by the individual print jobs is the number of deliveries. The number of print jobs in the print job list is increased each time a print job is generated after print settings, etc. and the print job is added to the list. The print jobs are distinguished by identification information of the individual print jobs. In the example illustrated in FIG. 6, the identification information of the print jobs is represented as print jobs 1, 2, etc.

More detailed information is associated with the identification information of the print jobs. In FIG. 6, examples of the detailed information are illustrated on a right side in the figure. For example, a print job corresponding to the identification information of the print job 1 is associated with information indicating that colored inks are used, a size of print media is A1, etc. as the print settings. Other information indicating a process being executed, a subdivided process being executed, and the number of copies are also associated. Note that, when there is no process corresponding to the process being executed, the information corresponding to the process is not associated. For example, in the example of the print job 2 illustrated in FIG. 6, there is no subdivided process being executed, and therefore, "–" is indicated to represent that there is no subdivided process being executed.

In this embodiment, a process for producing print products includes a process of waiting for a setting of print conditions, a process of adjusting colors of print products, a process of waiting for a start of printing, a print-in-progress process, and a print completion process. Thus, when the process for producing print products is divided into a number of processes, it is easier to recognize the progress of the process and to manage the process. The information indicating a start and an end of each process is supplied to the server 10, and the product information 10c2 is updated based on the information. Specifically, when the information indicating a start of one of the processes is supplied to the server 10, the processor 10a updates the product information 10c2 and determines the process in question as a process being executed. When information indicating an end of one of the processes is supplied, the processor 10a updates the product information 10c2 so that the process being executed is no longer being executed.

Information indicating a start and an end of each process may be supplied to the server 10 in various ways. The process of waiting for a setting of print conditions is for a setting of print conditions for printing based on the print data 10c1, and a print job is generated by this process. The print conditions may be set in various ways. It is assumed that print conditions are input in the terminal 20 using a predetermined print condition setting interface. In this case, in the terminal 20, the user starts an operation of setting print conditions for a print job for arbitrary print data 10c1 using the print condition setting interface. When this operation is started, the terminal 20 supplies information indicating a start of the process of waiting for a setting of print conditions for the print job to the server 10. Furthermore, in this example, when the user instructs an end of the setting of print conditions using the print condition setting interface, information indicating the end of the process of waiting for the setting of print conditions is supplied from the terminal 20 to the server 10.

In the example illustrated in FIG. 6, when the setting of print conditions for a print job corresponding to the identification information of the print job 1 in the print data 10c1 corresponding to the file name of FILEA.PDF are started, the processor 10a registers the print job 1 in the print job list of the product information 10c2. Similarly, when the setting of print conditions is started for each of the print jobs corresponding to the identification information of the print jobs 2 and 3, the processor 10a additionally registers the print jobs 2 and 3 in the print job list of the product information 10c2. The processor 10a then updates the product information 10c2, for the print job in which the setting of print conditions have started, so that the information indicating the process being executed indicates the process of waiting for a setting of print conditions. When the operation of setting print conditions is completed, the processor 10a updates the product information 10c2 with the information of "–" indicating that there is no information indicating the process being executed for the print job.

The process of adjusting a color of print products is for specifying a specific color for print products, such as specifying a sample color or a color profile. The process may be performed using various devices, and a colorimeter may be used, the terminal 20 may be used, or both may be used, for example. It is assumed that color adjustment is performed in the terminal 20 using a color adjustment interface. In this case, in the terminal 20, the user starts a color adjustment process for arbitrary print data 10c1 using the color adjustment interface. When this operation is started, the terminal 20 supplies information indicating a start of the color adjustment process on print products to the server 10. The processor 10a updates the product information 10c2 for a print job in which the print color adjustment process has been started so that the information indicating the process being executed corresponds to the print color adjustment process.

Furthermore, in this example, when the user instructs an end of the color adjustment using the color adjustment interface, information indicating an end of the print color adjustment process is supplied from the terminal 20 to the server 10. The processor 10a updates the product information 10c2 with the information of "–" indicating that there is no information indicating the process being executed for the print job in which the print color adjustment process has been terminated.

The process of waiting for a start of printing is performed between completion of the setting of print conditions and the color adjustment for the print job and a start of printing by the printer 31. However, when the color adjustment is not required, the process of waiting for a start of printing is performed between the completion of the setting of print conditions and the start of printing by the printer 31. In this embodiment, the process of setting print conditions and the process of adjusting colors are performed with the print data 10c1 stored in the nonvolatile memory 10c of the server 10. Meanwhile, the printing is performed by the printer 31. Therefore, before a print process is started, the print data 10cl is required to be transferred to the computer 30, and furthermore, the print execution data 30c1 is required to be generated using the print data 10cl by the computer 30. The process of waiting for a start of printing corresponds to a process for performing these processes.

The process of waiting for a start of printing in this embodiment is subdivided into the process during data transmission, the process of transmission completion, the process during image processing, and the process of image processing completion, as described above. The process during data transmission is performed while the print data 10c1 is transmitted from the server 10 to the computer 30, and the process of transmission completion indicates that all files corresponding to the print data 10cl have been stored in the nonvolatile memory 30c of the computer 30.

Therefore, when starting a process of transmitting the print data 10cl to the computer 30 for printing a print job, the processor 10a updates the product information 10c2 for the print job and determines the process of waiting for a start of printing as the process being executed. In addition, the processor 10a updates the product information 10c2 and determines the process during data transmission as a subdivided process being executed.

When the transmission of the print data 10cl is completed, the processor 30a of the computer 30 transmits information indicating completion of a reception of the transmitted print data 10cl to the server 10 via the communicator 30b. When receiving the information via the communicator 10b, the processor 10a of the server 10 updates the product information 10c2 for the print job to be printed using the transmitted print data 10cl, and determines the process of data transmission completion as a subdivided process being executed.

Note that, when a plurality of print jobs are executed based on the same print data 10cl and when the plurality of print jobs are executed on the same computer 30 and the same printer 31, data transmission is performed only once. Therefore, the print data 10cl is transmitted once for the plurality of print jobs, and the single transmission determines progress of the subdivided process during data transmission and the subdivided process of data transmission completion for the plurality of print jobs. On the other hand, when the plurality of print jobs are executed on the different computers 30 and the different printers 31, progress of the subdivided process during data transmission and the subdivided process of data transmission completion for print jobs are determined independently for each of the different computers 30.

When the transmission of the print data 10cl is completed, the processor 30a of the computer 30 starts image processing on the print data 10cl that has been transmitted in the order of the earliest print order. When image processing is started, the processor 30a transmits information indicating a start of image processing for the print job corresponding to the print data 10cl in which the image processing has been started to the server 10 via the communicator 30b. When receiving the information via the communicator 10b, the processor 10a of the server 10 updates the product information 10c2 for the print job corresponding to the print data 10cl in which the image processing is being performed, and the process during image processing is determined as the subdivided process being executed.

When the image processing is completed, the processor 30a of the computer 30 stores the print execution data 30c1 generated by the image processing in the nonvolatile memory 30c. When the print execution data 30c1 is stored, the processor 30a transmits information indicating the completion of the image processing for the print job corresponding to the print execution data 30c1 in which the image processing has been completed to the server 10 via the communicator 30b. When receiving the information via the communicator 10b, the processor 10a of the server 10 updates the product information 10c2 for the print job corresponding to the print execution data 30c1 in which the image processing has been completed, and determines the process of image processing completion as the subdivided process being executed.

The print-in-progress process indicates that the printer 31 is executing printing for the print job based on the print execution data 30c1. The computer 30 selects the print execution data 30c1 corresponding to the print job with the earliest print order from among the print execution data 30c1, and executes printing after transmitting the selected print execution data 30c1 to the printer 31. At this time, the computer 30 transmits information indicating a print job in which the printing has been started to the server 10. When receiving the information via the communicator 10b, the processor 10a of the server 10 updates the product information 10c2 for the print job in which the printing has been started and determines the print-in-progress process as the process being executed. At this time, the processor 10a updates the product information 10c2 for the subdivided process with the information of "–" indicating that there is no subdivided process being executed.

The print completion process indicates that printing for the print job has been completed in the printer 31. When the printing using the print execution data 30c1 is completed in the printer 31, the printer 31 transmits information indicating the completion of the printing for the print job to the computer 30. The computer 30 transmits to the server 10 the completion of the printing for the print job based on the information. When receiving the information via the communicator 10b, the processor 10a of the server 10 updates the product information 10c2 for the print job in which the printing has been completed and determines the print completion process as the process being executed. In the print completion process, print products may be picked up from the printer 31 and shipped to a client.

3 Display Control Process

According to the above process, the server 10 may identify progress of a process of a print job by referring to the product information 10c2. In this embodiment, the user may operate the terminal 20 to display on the display 20d the progress of the process of the print job indicated by the product information 10c2. Specifically, when the user operates the input unit 20e of the terminal 20 so as to instruct display of the progress of the process, a request for displaying the progress is transmitted from the terminal 20 to the server 10.

When the processor 10a of the server 10 obtains the display request, the processor 10a executes programs not illustrated so as to function as the progress acquirer 10a1, the subdivision progress acquirer 10a2, the process display 10a3, and the subdivided process display 10a4. The processor 10a then executes a display control process illustrated in FIG. 7.

Specifically, the processor 10a displays an initial screen of the process display screen by the function of the process display 10a3 (step S100). Specifically, the processor 10a transmits information for rendering the initial screen of the process display screen to the terminal 20. As a result, the processor 20a of the terminal 20 displays the initial screen of the process display screen on the display 20d. In the following, as a process of displaying a screen performed by the processor 10a, the processor 10a of the server 10 transmits the information for rendering the screen to the terminal 20, and the screen is displayed on the display 20d.

Figure 8:
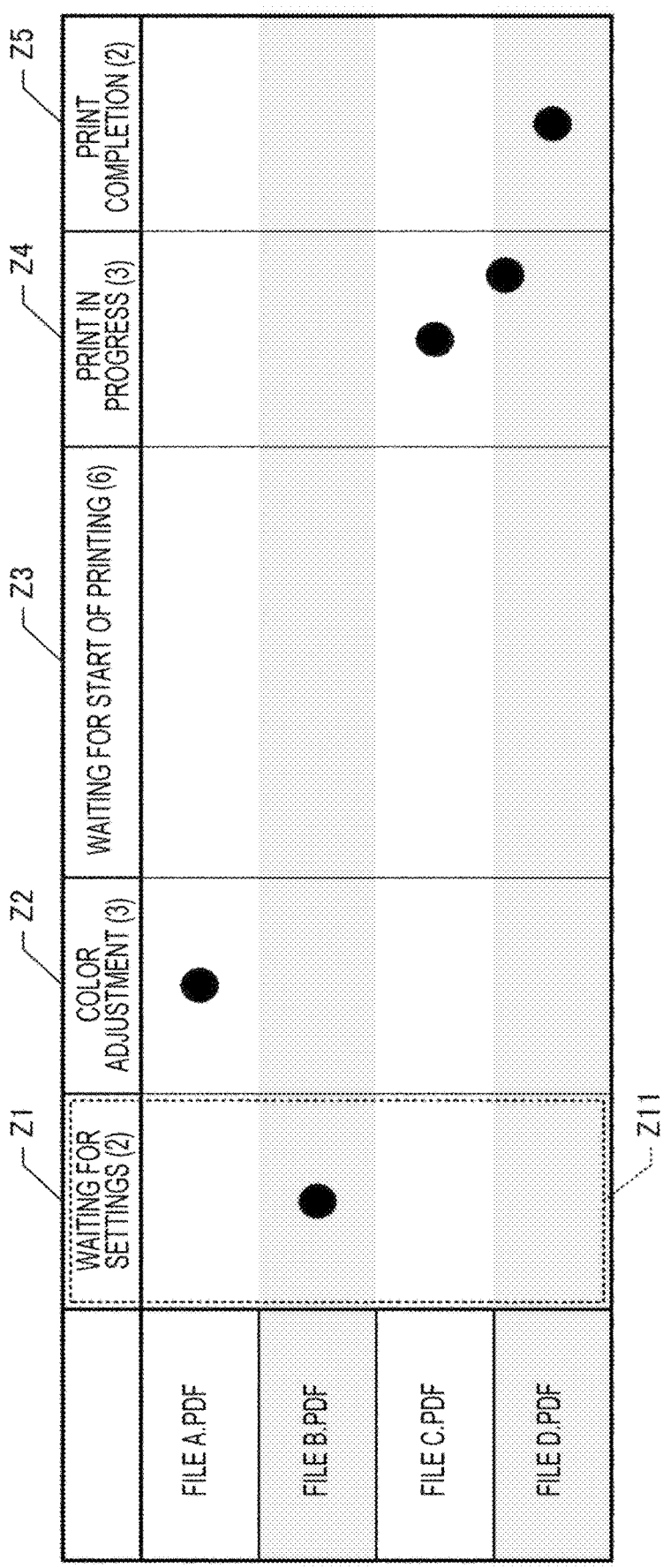
FIG. 8 is a diagram illustrating an initial screen of a process display screen.

FIG. 8 is an example of the process display screen. As shown in FIG. 8, the process display 10a3 displays file names, which are identification information indicating the print data 10c1, in a vertical direction. The process display 10a3 displays the plurality of processes side by side in the horizontal direction. In this embodiment, the processes are arranged in chronological order, with the earlier processes on the left and the later processes on the right.

In this embodiment, the process display 10a3 displays regions Z1 to Z5 corresponding to the individual processes on the process display screen. That is, the plurality of processes are, from left to right, the process of waiting for a setting of print conditions, the process of adjusting colors of print products, the process of waiting for a start of printing, the print-in-progress process, and the print completion process, and the regions Z1 to Z5 of a predetermined size are assigned to the respective processes in the horizontal direction. The process display 10a3 displays the names of the processes in the regions Z1 to Z5. Thus, when the progress of the processes is displayed in the regions, the user may easily distinguish the processes from one to another.

As described above, the file names indicating the print data 10c1 are arranged in the vertical direction, and the progress of the processes of the print data 10c1 is displayed below the regions Z1 to Z5 of the processes. For example, in the example illustrated in FIG. 8, four file names indicating the print data 10c1 are vertically arranged. Below the region Z1 corresponding to the process for waiting for a setting, a region Z11 corresponding to the four files is provided. Although a dashed line frame is illustrated in FIG. 8 to indicate the region Z11, the dashed line frame is not displayed on the display 20d of the terminal 20. In FIG. 8, processes being executed are indicated by black circles, and numerical values indicating the numbers of copies of print products being executed in the individual processes are also illustrated in the regions Z1 to Z5 indicating the names of the processes. However, the screen displayed in step S100 is the initial screen of the process display screen, and no such black circles or numerical values are displayed in step S100. Furthermore, in the example illustrated in FIG. 8, display before the display of the process display screen is completed, that is, display in course of a process of generating a display screen is illustrated, and the subdivided processes are not yet displayed.

When the initial screen of the process display screen is displayed, the processor $10a$ selects the print data of a processing target through the function of the progress acquirer $10a1$ (step S105). In this embodiment, the processor $10a$ selects one print data $10c1$ of the processing target in a unit of file and executes a loop from step S105 to step S170 on the print data $10c1$ of the processing target. The processor $10a$ then refers to the nonvolatile memory $10c$ to identify the file stored as the print data $10c1$. The processor $10a$ then selects one file that has not been selected as the processing target of the loop from step S105 to step S170 and determines the selected file as the print data $10c1$ of the processing target.

Next, the processor $10a$ identifies a print job generated from the print data of the processing target through the function of the progress acquirer $10a1$ (step S110). Specifically, the processor $10a$ refers to the product information $10c2$ and identifies a print job list associated with the file name of the print data $10c1$ of the processing target. The processor $10a$ then obtains identification information of the print job indicated by the identified print job list. For example, in the example illustrated in FIG. 6, when the file name of the print data $10c1$ of the processing target is "FILEA.PDF", the processor $10a$ identifies the print jobs 1, 2, and 3 as print jobs generated using the print data of the processing target.

Next, the processor $10a$ obtains processes to which the print jobs belong using the function of the progress acquirer $10a1$ (step S115). Specifically, the processor $10a$ refers to the product information $10c2$ to obtain the processes being executed for the individual print jobs identified in step S110. For example, in the example illustrated in FIG. 6, the processor $10a$ identifies the print jobs 1, 2, and 3 as the process of waiting for a start of printing, the process of adjusting colors, and the process of waiting for a start of printing, respectively.

Next, the processor $10a$ displays the progress for print jobs belonging to the processes other than the process of waiting for a start of printing using the function of the process display $10a3$ (step S120). Specifically, when a process other than the process of waiting for a start of printing is included in the processes obtained in step S115, the processor $10a$ displays an image indicating that the process is being executed on the process display screen. In this embodiment, the image indicating that a process is being executed corresponds to a black circle. For example, in the example illustrated in FIG. 6, among the print jobs 1, 2, and 3, the print job 2 is included in the processes other than the process of waiting for printing, and the process of adjusting colors is being executed in the print job 2. In this case, the processor $10a$ displays a black circle in the region corresponding to the process of adjusting colors for "FILEA.PDF" corresponding to the print data $10c1$ of the processing target. It is assumed, in FIG. 8, that the process displays a black circle in the region corresponding to the process of adjusting colors that is a second region from left in a row of "FILEA.PDF".

Note that, in this embodiment, the processor $10a$ also displays the number of copies of print products to be printed by the print job. Therefore, the processor $10a$ obtains the number of copies of print products to be printed by the print job based on the product information $10c2$ for each of the processes other than the process of waiting for a start of printing. A sum of the numbers of copies of print products are then calculated for each process and displayed on the process display screen in association with the process. Specifically, the processor $10a$ calculates and displays a sum of the numbers of copies of print products printed by the processes being executed.

In FIG. 8, a sum of the numbers of copies is displayed in parentheses in each of the regions Z1 to Z5 corresponding to the respective processes. For example, in the region Z2 for the process of adjusting colors, a numerical value 3 is shown in parentheses. The numerical value 3 is specified because the process being executed for the print job 2 illustrated in FIG. 6 is the process of adjusting colors and the number of copies is 3. The numbers of copies in parentheses in the regions Z1 to Z5 are cumulative numbers of copies printed by the processes being executed, and when the print jobs in the plurality of print data $10c1$ are executing the same process, a sum of the numbers of copies printed in the individual print jobs is displayed. Accordingly, the processor $10a$ accumulates and displays the numbers of copies of print products for individual processes in the process from step S105 to step S165 while the print data $10c1$ of the print target is changed. According to the above configuration, the user may recognize the numbers of copies of print products printed by the print jobs belonging to the individual processes. Thus, for example, when the progress of printing of print products is delayed, it becomes easier to take measures, such as increase in the number of facilities and personnel, to a process in which a number of print jobs which is larger than expected are backlogged.

Next, the processor $10a$ determines whether there is a print job belonging to the process of waiting for a start of printing through the function of subdivision progress acquirer $10a2$ (step S125). Specifically, when the process of waiting for a start of printing is included in the processes obtained in step S115, the processor $10a$ displays an image indicating a subdivided process being executed on the process display screen. Therefore, the processor $10a$ first determines in step S125 whether at least a print job belongs to the process of waiting for a start of printing. When it is not determined in step S125 that at least a print job belongs to the process of waiting for a start of printing, the processor $10a$ skips step S130 to step S165.

On the other hand, when it is determined in step S125 that at least a print job belongs to the process of waiting for a start of printing, the processor $10a$ displays the initial screen of the subdivided process display screen by the function of the subdivided process display $10a4$ (step S130). Specifically, the processor $10a$ transmits information for rendering the initial screen of the subdivided process display screen to the terminal 20, and displays the initial screen of the subdivided process display screen in the process display screen.

The subdivided process display screen is used to display progress of the subdivided processes, and the processor $10a$ displays the subdivided processes being executed in a distinguishable manner in a subdivided region obtained by subdividing a region corresponding to the process. Specifically, the region corresponding to the process is subdivided into a plurality of subdivided regions that correspond to the individual subdivided processes. The processor $10a$ then displays graphics in the respective subdivided regions that correspond to the subdivided processes. In this embodiment, the subdivided processes are the process during data transmission, the process of data transmission completion, the process during image processing, and the process of image processing completion, and graphics corresponding to the subdivided processes are displayed.

Figure 9:
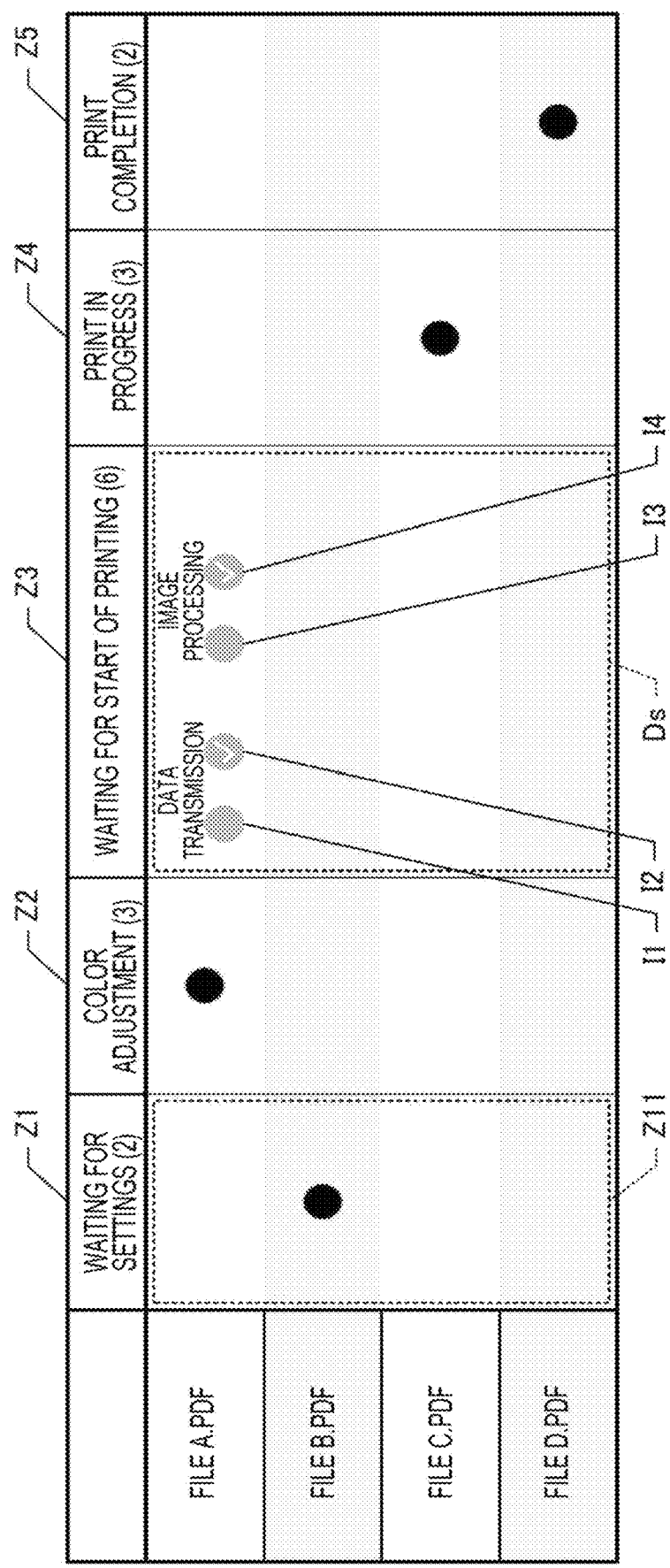
FIG. 9 is a diagram illustrating an initial screen of a subdivided process display screen.

FIG. 9 is a diagram illustrating a state in which an initial screen of a subdivided process display screen Ds is displayed on the process display screen illustrated in FIG. 8. That is, in the initial screen of the subdivided process display screen Ds, the subdivided processes are indicated by circle icons I1 to I4. Text indicating contents of the subdivided processes is also displayed. The two icons I1 and I2 with text "data transmission" correspond to the subdivided processes regarding transmission of the print data 10c1 from the server 10 to the computer 30. These icons are distinguished from each other by presence or absence of a check mark. That is, the left icon I1 without a check mark indicates the process during data transmission, and the right icon I2 with a check mark indicates the process of data transmission completion. The two icons I3 and I4 with text "image processing" correspond to the subdivided processes regarding image processing to be performed on the print data 10c1 by the computer 30. These icons are also distinguished from each other by presence or absence of a check mark. That is, the left icon I3 without a check mark indicates the process during image processing, and the right icon I4 with a check mark indicates the process of image processing completion.

In the initial screen of the subdivided process display screen Ds, these icons I1 to I4 are all grayed out. In this embodiment, a configuration indicating whether each of the subdivided processes is being executed by changing a mode of a corresponding one of the icons I1 to I4 in accordance with whether the subdivided process is being executed is employed. Various changes may be employed as the change in mode, but in this embodiment, a color of the icons I1 to I4 is changed to indicate whether execution is in progress. Specifically, the gray icons I1 to I4 indicate that the subdivided processes are not being executed, while the icons I1 to I4 colored black indicate that the subdivided processes corresponding to the icons are being executed.

The processor 10a completes the display on the subdivided process display screen by executing step S135 and subsequent processing. Specifically, the processor 10a selects one of the subdivided processes of a processing target by the function of the subdivision progress acquirer 10a2 (step S135). In this embodiment, the processor 10a selects one of the subdivided processes as a processing target and executes a loop from step S135 to step S160 on the subdivided process of the processing target. Therefore, the processor 10a selects one of the subdivided processes that has not been selected as the processing target in the loop from step S135 to step S160 from among the process during data transmission, the process of data transmission completion, the process during image processing, and the process of image processing completion.

Next, the processor 10a specifies all print jobs that belong to the subdivided process of the processing target by the function of the subdivision progress acquirer 10a2 (step S140). Specifically, the processor 10a refers to the product information 10c2 regarding print jobs which correspond to the print data 10c1 of the processing target and which are executing the process of waiting for a start of printing, so as to specify the print jobs belonging to the subdivided process of the processing target, if any. For example, in the example illustrated in FIG. 6, it is assumed that the print data 10c1 of the processing target corresponds to "FILEA.PDF" and the subdivided process of the processing target is the process during data transmission. In this case, the processor 10a refers to the product information 10c2 of "FILEA.PDF" which corresponds to the print data 10c1 of the print target, so as to determine that the print jobs 1 and 3 are the processes of waiting for a start of printing and the print job 2 is not the process of waiting for a start of printing. The processor 10a then specifies the individual subdivided processes for the print jobs 1 and 3, respectively, and specifies that the process during data transmission which is the subdivided process of the processing target is the subdivided process being executed for the print job 1.

Next, the processor 10a determines whether at least a print job belongs to the subdivided process of the processing target by the function of the subdivided process display 10a4 (step S145). Specifically, the processor 10a determines whether one or more print jobs have been specified by the process in step S140.

When it is determined in step S145 that at least a print job belongs to the subdivided process of the processing target, the processor 10a performs the process in step S150 and step S155. When it is determined in step S145 that any print job does not belong to the subdivided process of the processing target, the processor 10a skips step S150 and step S155.

In step S150, the processor 10a activates the icon corresponding to the subdivided process of the processing target by the function of the subdivided process display 10a4 (step S150). Specifically, the processor 10a transmits information for displaying the icon indicating the subdivided process of the processing target in black to the terminal 20. As a result, the icon indicating the subdivided process of the processing target is displayed in black on the subdivided process display screen on the display 20d.

Figure 10:
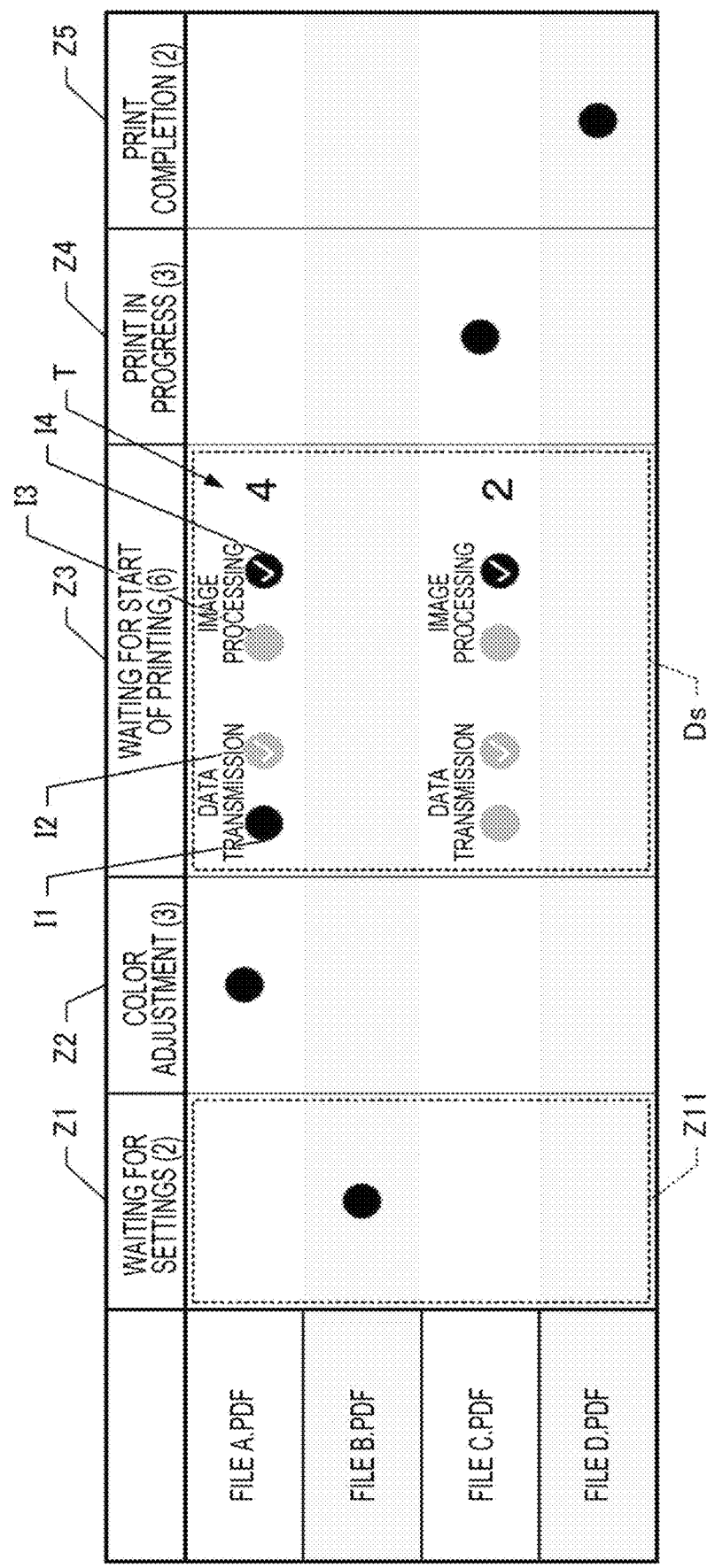
FIG. 10 is a diagram illustrating an example of display of the subdivided process display screen.

It is assumed, in the example shown in FIG. 6, that the print data 10c1 of the processing target is "FILEA.PDF", the subdivided process of the processing target is the process during data transmission, and the process of data transmission is specified as the process being executed for the print job 1. In this case, the processor 10a changes an icon corresponding to the process of data transmission that is the subdivided process of the processing target to black. FIG. 10 is a diagram illustrating an example of the subdivided process display screen after a mode of an icon is changed, and the icon I1 is displayed in black. Note that, in FIG. 10, a result of display after the loop from step S135 to step S160 is repeatedly executed and the process of image processing completion is the subdivided process of the processing target is illustrated. In the example illustrated in FIG. 6, in the print job 3, the process of image processing completion is the subdivided process being executed, and therefore, the icon I4 corresponding to the process of image processing completion is also displayed in black in FIG. 10.

Next, the processor 10a adds the number of copies of the print job belonging to the subdivided process of the processing target to a sum of the numbers of copies by the function of the process display 10a3 (step S155). In this embodiment, a configuration in which the sum of the numbers of copies to be printed by the print job that is executing the process of waiting for a start of printing is shown in the print data 10c1 is employed. Therefore, the processor 10a predefines the sum of the numbers of copies as a variable for measuring the number of copies. In step S155, the number of copies of the print job belonging to the subdivided process of the processing target is added to the sum of the numbers of copies.

Next, the processor 10a determines whether processing has been completed on all the subdivided processes (step S160). Specifically, when the process from step S135 to step S160 are performed on the individual processing targets while all the process during data transmission, the process of data transmission completion, the process during image processing, and the process of image processing completion are set as the processing targets, the processor 10a determines that all the subdivided processes have been processed. When it is determined in step S160 that at least one of the subdivided processes has not been processed, the processor 10a repeats the process from step S135 onward.

On the other hand, when it is determined in step S160 that all the subdivided process have been processed, the processor 10a displays the sum of the numbers of copies using the function of the subdivided process display 10a4 (step S165). In other words, the processor 10a displays a value of the sum of the numbers of copies obtained by the loop in step S155 on the subdivided process display screen corresponding to the print data 10c1 of the processing target. As a result, the number of copies of print products printed by the print job generated using the print data 10c1 of the processing target and in which the process of waiting for a start of printing is being executed is displayed on the display 20d of the terminal 20.

It is assumed, in the example illustrated in FIG. 6, that the print data 10c1 of the processing target is "FILEA.PDF". In this case, when each of the subdivided processes is processed and the total number of copies is counted, the processor 10a calculates the total number of copies, that is, 4, as a sum of 2, which is the number of copies printed for the print job 1, and 2, which is the number of copies printed for the print job 3. In FIG. 10, an example of the display in this case is shown. For "FILEA.PDF", the number of copies printed by the print job that is executing the process of waiting for a start of printing is 4, and therefore, 4 is displayed as the total number of copies T in the subdivided process display screen, as illustrated in FIG. 10.

According to the above configuration, the user may recognize, for each print data 10cl, the number of copies of print products printed by a print job that belongs to the process of waiting for a start of printing. The print data 10cl indicates details of a request for printing by a client, and usually a delivery destination of print products delivered by the same print data 10cl is the same client. Therefore, when the number of copies is cumulatively displayed for each print data 10cl, the user may recognize progress of the process of waiting for a start of printing for each request. Therefore, it may be determined, for each request, whether the process of waiting for a start of printing is quickly or slowly progresses, etc., and furthermore, it may be easily determined whether to cope with stagnation in progress, etc.

The total number of copies displayed in the subdivided process display screen is the total number of copies for each print data 10c1. Thus, for given print data 10c1, when a plurality of print jobs exist and the process being executed for the plurality of print jobs is a process of waiting for a start of printing, the number of copies printed by the print jobs is accumulated. On the other hand, in the region Z3, which displays a name of the process of waiting for a start of printing, the number of copies displayed in parentheses is the number of copies printed by the process of waiting for a start of printing. Thus, when the process of waiting for a start of printing is being executed in the print jobs corresponding to the plurality of print data 10c1, the numbers of copies of print products printed by the print jobs is displayed in parentheses. For example, in the example shown in FIG. 10, the number of copies printed by the print job for FILEA.PDF, which belongs to the process of waiting for a start of printing, is 4, and the number of copies printed for FILEC.PDF is 2, and therefore, the total number, 6, is displayed in parentheses.

When the process in step S165 is performed, or when it is not determined in step S125 that there is a print job belonging to a process of waiting for a start of printing, the processor 10a determines whether processing has been completed for all the print data (step S170). In other words, the processor 10a determines whether the loop from S105 to S165 has been performed on all the print data 10c1 stored in the nonvolatile memory 10c. When it is not determined in step S170 that processing has been completed for all the print data, the processor 10a repeatedly performs the process from step S105 onward. When it is determined in step S170 that processing has been completed for all print data, the processor 10a terminates the display control process.

According to the above process, the user may monitor the progress of the print process through the process display screen displayed on the display 20d. Therefore, in a state in which print jobs for a plurality of print data 10c1 coexist, the user may recognize delay in progress of the process, etc. Furthermore, the user may monitor the progress of the subdivided process, which subdivides the process of waiting for a start of printing, through the subdivided process display screen displayed on the display 20d. Thus, the user may know the detailed progress of the print process. Furthermore, when only the progress of the process of waiting for a start of printing is recognized, it is difficult to identify a cause, for example, even when a stagnation has occurred in progress of a process that takes longer than expected by the user in the process of waiting for a start of printing. However, when the progress of the subdivided process may be recognized, the user may easily identify the cause of the stagnation. Therefore, the user may easily take measures according to the cause of the stagnation of the process.

Furthermore, the subdivided process in the embodiment described above includes a process related to the transmission of the print data 10c1. The transmission of the print data 10c1 may be stuck due to a network failure, a lack of bandwidth, malfunctions of the computer 30, etc. The subdivided process allows the user to identify the stagnation of the process related to the transmission of the print data 10c1. Thus, the user can easily identify whether the stagnation is caused by the transmission of the print data 10c1.

Furthermore, the subdivided processes in the embodiment described above include a process related to image processing based on the print data 10c1. The image processing may be stuck due to malfunctions of the computer 30, a lack of specifications, a software failure, etc. In this embodiment, the subdivided processes allows the user to identify the stagnation of a process related to image processing based on the print data 10c1. Thus, the user may easily identify presence or absence of stagnation caused by the image processing on the print data 10C1.

Furthermore, since progress of a process is indicated by an icon, which is a graphic corresponding to a subdivided process, the user may easily identify the subdivided process for which progress is indicated. Furthermore, in this embodiment, it is possible to indicate whether the subdivided process is in progress by changing a mode of the icon which is a graphic. Accordingly, the user may easily determine whether the subdivided process is in progress.

Furthermore, in this embodiment, when at least one print job belongs to the process of starting printing, the process in step S130 and subsequent processing are executed to display the information on the subdivided process. On the other hand, when any print job does not belong to the process of starting printing, the process from step S130 to step S165 is skipped and information on the subdivided process is not displayed. Therefore, when the condition in which at least one print job belongs to the process of starting printing is regarded as a display condition, the configuration in which subdivided processes obtained by subdividing a process are displayed is employed to satisfy the display condition in this embodiment. According to this configuration, when the display condition is not satisfied, the subdivided process is not displayed, and therefore, the initial screen of the subdivided process display screen is not displayed. Accordingly, the process display screen may be simplified. Note that various conditions may be employed instead of the condition in which at least one print job belongs to the process of starting printing. For example, the following configuration may be employed. That is, a subdivided process is displayed when the subdivided process is not terminated even after a period of time equal to or longer than a threshold value has elapsed after start of the subdivided process, and the subdivided process is not displayed when the subdivided process is terminated before the period of time equal to or longer than the threshold value has elapsed. When the subdivided process is not displayed and when there is a print job that is executing the process of waiting for a start of printing, an indication of its existence, for example, by a single black circle, may be displayed.

4 Other Embodiments

The foregoing embodiment is merely an example for embodying the present disclosure and various other embodiments may be employed. For example, in the embodiment described above, the server 10 and the terminal 20 are configured as different devices, but they may be the same device, or they may be distributed among three or more devices. The process illustrated in FIG. 7 may be executed by the terminal 20. In other words, the server 10 may be configured to supply the latest product information 10c2, the latest printer information 10c3, and the like to the terminal 20, and the processor 20a of the terminal 20 executes the display control process based on the information.

Furthermore, a method for subdividing the process of waiting for a start of printing is not limited to the method described in the foregoing embodiment. The process of waiting for a start of printing may be subdivided according to processing to be performed in the process of waiting for a start of printing, specifications of the computer 30, or the like. Here, it is assumed, in the same configuration as shown in FIGS. 1 to 5 above, that, when an instruction for executing printing is issued to a print device, the print data 10cl stored in the nonvolatile memory 10c that is a storage medium of the server 10 is transmitted to the computer 30, as specifications of an embodiment. Furthermore, in this case, the transmitted print data 10cl is stored in a default storage location (a folder) in the nonvolatile memory 30c in the computer 30. Furthermore, in this case, the processor 30a of the computer 30 executes an image processing program, starts capturing of print data stored in the default storage location according to the print order, and performs image processing.

Figure 7:
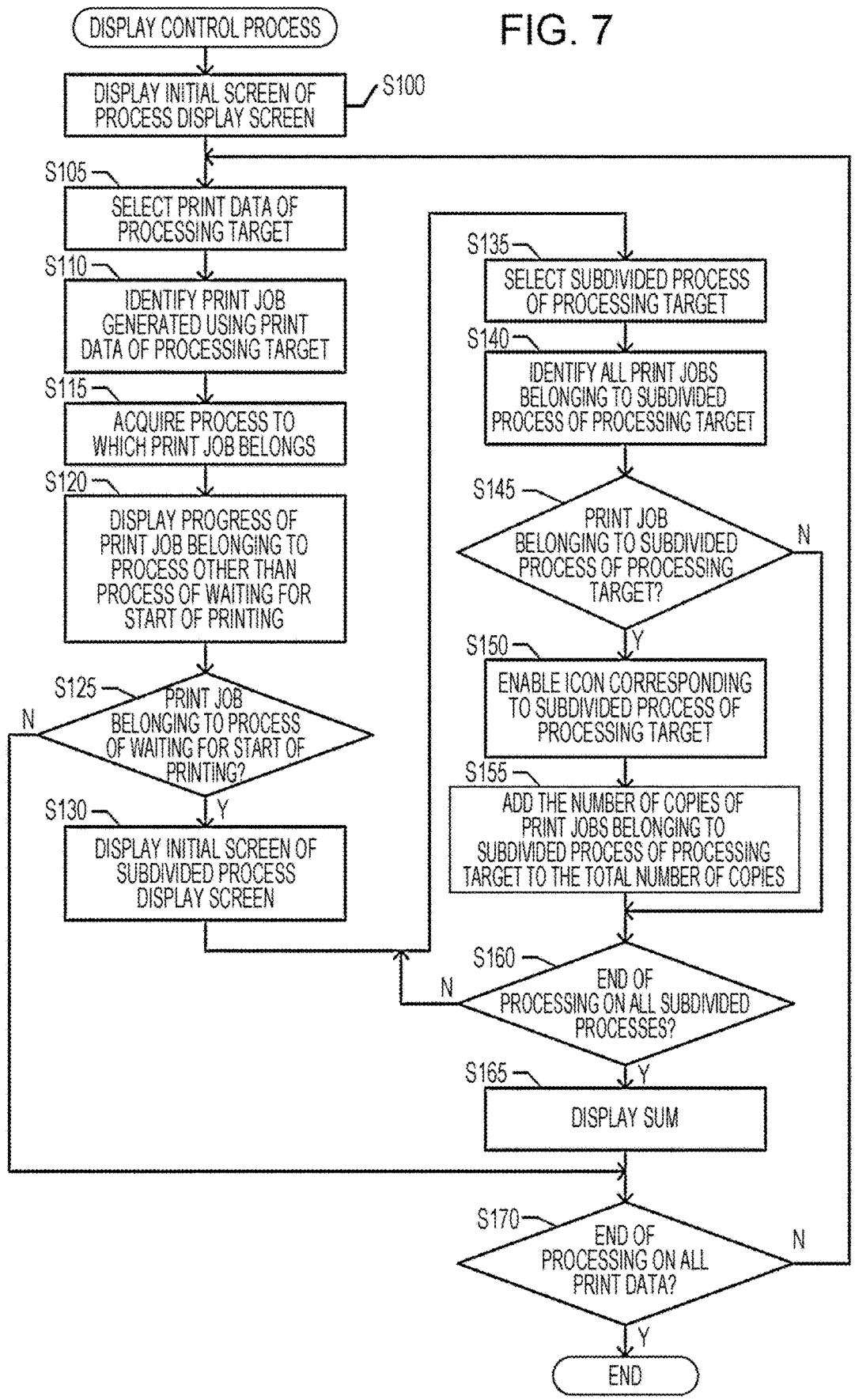
FIG. 7 is a flowchart of a display control process.
Figure 11:
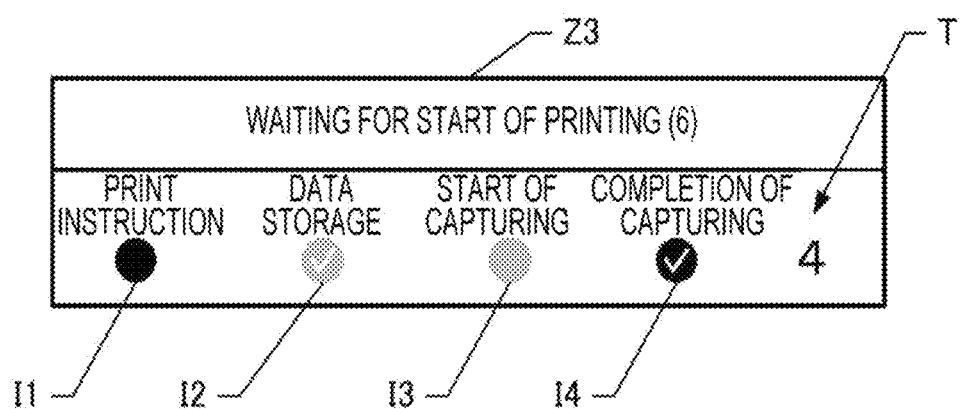
FIG. 11 is a diagram illustrating an example of display of the subdivided process display screen.

In this embodiment, for example, it may be assumed that the process of waiting for a start of printing is subdivided into a process of instructing printing, a process of storing print data in a predetermined storage location (a folder), a process of starting capturing of print data by an image processing program, and a process of completing capturing of print data. Also in this configuration, the product information 10c2 stored in the processor 10a of the server 10 is updated in accordance with a start and an end of each process. The display control process as illustrated in FIG. 7 then displays a subdivided process display screen as illustrated in FIG. 11. Note that FIG. 11 is an example of a screen obtained by extracting, from the process display screen, the subdivided process display screen. In the example in FIG. 11, an icon I1 indicating the process of instructing printing, an icon I2 indicating the process of storing print data in the predetermined storage location (a folder), an icon I3 indicating the process of starting capturing of print data by the image processing program, and an icon I4 indicating the process of completing capturing of print data are displayed. The progress of the subdivided processes is then displayed by these icons. As described above, according to the configuration in which the process of waiting for a start of printing is subdivided in accordance with processes to be performed in the process of waiting for a start of printing, the specifications of the computer 30, or the like, the progress of the subdivided processes appropriately corresponding to the processes and the specifications may be displayed.

Furthermore, a configuration may be employed in which accompanying information of the subdivided processes corresponding to graphics is displayed by means of tooltips. The accompanying information may be any information related to the subdivided processes, for example, the meanings of icons. In FIG. 12, an example of a screen in the example shown in FIG. 10 with a tooltip Tc is illustrated. Tooltips are icons that are displayed by hovering the mouse pointer over a target icon, etc. In this example, the tooltip is a function that displays text indicating a meaning of a target icon within a frame of a speech bubble. When this configuration is employed, for example, in the embodiment described above, the user operates the input unit 20e of the terminal 20 to generate a tooltip display trigger, such as hovering of a mouse pointer over a target icon.

In this case, the terminal 20 transmits a request for displaying a tooltip and information indicating an icon to be displayed to the server 10. In response to the display request, the processor 10a of the server 10 identifies the icon to be displayed and obtains a character string that is recorded in the nonvolatile memory 10c and that is associated with the icon to be displayed. In this example, the character string indicates a meaning of the icon to be displayed, which is predefined and stored in the nonvolatile memory 10c. The processor 10a of the server 10 transmits the character string to the terminal 20. As a result, the terminal 20 displays the character string overlapped on the speech balloon pointing to the icon to be displayed. According to the above process, while the icon corresponding to the subdivided process is simplified, the accompanying information may be displayed by the tooltip function for a user who desires to know the meaning of the icon and the like.

Furthermore, at least one of the process display and the subdivided process display may be configured to display information indicating an error associated with a process when an error occurs in the process. In FIG. 12, an example of a screen in the example illustrated in FIG. 10 with an icon Ie indicating an error associated with a process is illustrated. When this configuration is employed, information indicating occurrence of an error is supplied to the server 10 in response to occurrence of the error in each process or each subdivided process.

For example, when the print data 10c1 is transmitted from the server 10 to the computer 30 but completion of the data transmission is not confirmed and a timeout occurs, the processor 10a determines that an error has occurred in the process during data transmission. Furthermore, when a timeout has occurred without confirmation of a start of image processing after the transmission of the print data 10c1 is completed, the processor 10a determines that an error has occurred in the process of data transmission completion. Furthermore, when a timeout has occurred without confirmation of completion of the image processing after the image processing is started based on the print data 10c1, the processor 10a determines that an error has occurred in the process during image processing. Furthermore, when a timeout has occurred without confirmation of a start of printing by the printer 31 after the completion of the image processing, the processor 10a determines that an error has occurred in the process of image processing completion. Note that information for confirming the start and the completion of each of the subdivided processes is transmitted from the computer 30 to the server 10 in accordance with progress of the subdivided process.

When an error has occurred, the processor 10a of the server 10 displays an icon indicating the error associated with a subdivided process in which the error has occurred. For example, in the embodiment described above, when an error has occurred in the process of image processing completion, a processor of the server 10 superimposes the icon Ie indicating the error on the icon I4 for the subdivided process, as illustrated in FIG. 12. According to the above process, when a subdivided process has been stuck, the user may more easily identify a cause of the stagnation. The process in which the error has occurred is not limited to a subdivided process, but may be any other process, e.g., the print-in-progress process. The occurrence of an error in the print-in-progress process is identified, for example, based on occurrence of an error in the printer 31. Note that the tooltip function may be used to display the meaning of the icon Ie indicating an error in detail.

Furthermore, at least one of the process display and the subdivided process display may be configured to display information indicating an event associated with a process when the event associated with the process is generated. In FIG. 12, an example of a screen in the example illustrated in FIG. 10 with an icon Iev indicating an event associated with a process is illustrated. When this configuration is employed, information indicating occurrence of an event is supplied to the server 10 in accordance with occurrence of an event in each process or each subdivided process.

It is assumed that information indicating that an amount of consumables in use in the printer 31 has fallen below a standard remaining level is transmitted from the printer 31 to the computer 30, and that the information is transmitted from the computer 30 to the server 10. In this case, the processor 10a of the server 10 determines that an event has occurred that is to be alerted to the user. Of course, a type of event is not limited to an alert event related to consumables, but a variety of events may be envisioned.

When an event has occurred, the processor 10a of the server 10 displays an icon indicating the event in association with a subdivided process in which the event has occurred. For example, in the embodiment described above, when an error has occurred in the process of image processing completion, the processor of the server 10 superimposes the icon Iev indicating the event on the icon I4 corresponding to the subdivided process, as illustrated in FIG. 12. According to the process described above, the user may take action for the event. For example, when an event has occurred that alerts the user about an amount of consumables remaining, the user can take action, such as addition of the consumables in advance to prevent stagnation from occurring. The process in which the event occurs is not limited to a subdivided process, and may be any other process, for example, the print-in-progress process. The tooltip function may be used to display the meaning of the icon Iev indicating the event in detail.

Furthermore, the subdivided process display may be configured to display an elapsed time since a start of the subdivided process being executed. In FIG. 12, an example of the elapsed time since the start of the subdivided process being executed in the example illustrated in FIG. 10 is indicated by a frame Tt displayed by the tooltip function. When this configuration is used, the processor 10a of the server 10 starts measuring the elapsed time since the start of each subdivided process using a timekeeping circuit not shown.

When the user instructs execution of the tooltip function indicating the elapsed time by means of the input unit 20e of the terminal 20, the processor 10a of the server 10 specifies the elapsed time for the indicated subdivided process. The processor 10a then displays a frame Tt associated with the indicated subdivided process, and also displays a numerical value indicating the elapsed time. An instruction for executing the tooltip function indicating the elapsed time may be performed in various modes, and a configuration in which a mouse pointer is overlapped on an icon corresponding to a subdivided process and a mouse button is clicked may be employed, for example. According to the above process, the user may easily recognize the elapsed time after the subdivided process is started. Accordingly, a determination as to whether the subdivided process is stuck may be easily made.

Furthermore, the subdivided process display may be configured to display the number of copies of print products to be printed by the subdivided process being executed. The total number of copies T illustrated in FIG. 10 above is a value of accumulation of the number of copies of print products for each print data 10cl. Thus, when a plurality of print jobs correspond to single print data 10cl and belong to different subdivided processes in the process of waiting for a start of printing, a sum of the numbers of copies of print products printed by the print jobs in the individual subdivided processes is displayed as the total number of copies T.

Instead of this display, the number of copies of print products may be obtained for each subdivided process and each may be displayed. Such a configuration may be realized by the same configuration as described above. In other words, when the numbers of copies of print products to be printed by the subdivided processes being executed is obtained, the processor 10a does not calculate a cumulative total but holds the numbers of copies of print products as the individual numbers of copies for subdivided processes. The processor 10a then displays the numbers of copies for individual print jobs.

In FIG. 13, an example in which a plurality of print jobs correspond to "FILEA.PDF" and three of the print jobs belong to the process of waiting for a start of printing is illustrated. The numbers of copies of print products printed by the individual three print jobs are one, two, and one, respectively, and in FIG. 13, the individual numbers of copies are illustrated for the corresponding print jobs. According to the above configuration, the user may recognize the numbers of copies of print products for individual print jobs. Furthermore, in FIG. 13, the subdivided process is displayed for each print job, and the three print jobs are executing the process of data transmission completion, the process of image processing completion, and the process during image processing. Therefore, in FIG. 13, icons corresponding to the subdivided processes being executed are colored black. According to the above configuration, the user may determine for each print job whether the subdivided process is stagnated, and may more easily identify a cause of the stagnation.

The progress acquirer at least acquires progress of processes for print products produced by the plurality of processes. In other words, the progress acquirer at least acquires a degree of the progress in the production of print products in association with the processes. The plurality of processes are predetermined, and print products are produced through at least one of the plurality of processes. For example, some print products may be produced through all the predetermined number of processes, while other print products may be produced by omitting some of the processes.

The processes are determined when the process being performed is displayed in a distinguishable manner. Therefore, the number of processes may be increased, decreased, or modified after the display device or the print device operates. The processes in the above embodiment are examples, and other processes may exist, some of the processes may be different, and some of the processes may be omitted. A method of division of a process from acceptance of order of print products to completion of printing may be different.

The print products are produced by at least printing, and may be produced through processes other than printing, such as laminate coating or panelizing. The progress of the process may be defined in various modes. Therefore, various configurations may be employed in addition to the configuration in which information indicating the processes being executed are defined for each print job. For example, information indicating processes that have already been completed may be defined for each print job, or information indicating processes that have not yet been performed may be defined for each print job.

The subdivision progress acquirer at least acquires the progress of subdivided processes obtained by subdividing a process in at least one of the plurality of processes. That is, at least one of the plurality of processes is subdivided into more detailed subdivided processes. The subdivision progress acquirer at least acquires the degree of progress of a subdivided process as progress associated with the subdivided process. The subdivided processes are predetermined, and the process proceeds through at least one of the plurality of subdivided processes. For example, some print products may be subjected to all the plurality of predetermined subdivided processes to complete the subdivided processes, while other print products may omit some subdivided processes to complete the subdivided processes.

The subdivided processes are determined when the subdivided process being performed is displayed in a distinguishable manner. Therefore, the number of subdivided processes may be increased, decreased, or modified after the display device or the print device operates. The subdivided processes in the above embodiment are examples, and other subdivided processes may exist, some of the subdivided processes may be different, or some of the subdivided processes may be omitted. A different method for subdividing the process of waiting for printing may be employed. Furthermore, a process other than the process of waiting for printing may be subdivided. For example, the process of adjusting colors may be subdivided into a start of color measurement, completion of color measurement, transmission of a print instruction, etc.

The subdivided processes are obtained by subdividing a process, and in the subdivision, a process may be represented by a greater number of subdivided processes, and a subdivided process may be generated from a process or a process may be generated from a subdivided process. For example, a process for producing a print product may be predefined as a subdivided process, and a process may be defined by selecting two or more consecutive subdivided processes.

The progress of the subdivided process may be defined in various ways. Therefore, various configurations may be employed in addition to the configuration in which information indicating the subdivided process being executed is defined for each print job. For example, information indicating subdivided processes that have already been completed may be defined for each print job, or information indicating subdivided processes that have not yet been performed may be defined for each print job.

The process display at least displays a plurality of processes on a display device while a process being executed is distinguishable. In other words, the process display displays a plurality of processes on the display device and at least displays a process being executed in a distinguishable manner so that progress of the process is recognized. Thus, a process that has already been completed may be displayed with a process that is being executed, or a process that has not yet been executed may be displayed with a process that is being executed. Various modes may be employed to display a plurality of processes. Therefore, the modes are not limited to the above-mentioned embodiment in which processes are arranged in chronological order in the horizontal direction for each print data. For example, the processes may be arranged in chronological order in the horizontal direction for each print job. In this case, various configurations can be employed, such as a configuration in which the progresses of a plurality of print jobs are displayed concurrently when the plurality of print jobs are generated from single print data.

The display device may be a device of any form and may be used by various entities in various locations, as long as the display device is capable of displaying at least the progress of a plurality of processes and a plurality of subdivided processes. The display device may be a separate device from the display control device, as in the embodiment described above, or may be an integrated with the display control device.

The subdivided process display at least displays a plurality of subdivided processes on the display device in a manner that the subdivided process being executed is distinguishable. In other words, the subdivided process display displays a plurality of subdivided processes on the display device and at least displays a subdivided process being executed in a distinguishable manner so that progress of the subdivided process is recognized. The display form of the subdivided process is also not limited, and a subdivided process that has already been completed may be displayed together with a subdivided process being executed, or a subdivided process that has not yet been executed may be displayed together with a subdivided process being executed.

Furthermore, the present disclosure is also applicable as a program or a method to be executed by a computer. Furthermore, the system, the program, and the method described above may be realized as a solo device or realized using components included in a plurality of devices, and various modes are included in the present disclosure. Furthermore, various modifications may be appropriately made, such as a configuration in which a portion is realized by software or a portion is realized by hardware. Furthermore, the present disclosure includes a recording medium for a program controlling the system. The recording medium for a program may be a magnetic recording medium, a semiconductor memory, or any recording medium that may be developed in the future.

The above embodiments are not intended to limit the present disclosure. Since the embodiment include a plurality of techniques with different effects, one issue and one effect that can be read from the embodiment are not necessarily an issue or an effect for all the techniques included in the embodiment.

What is claimed is:

1. A display control device, comprising:
a progress acquirer that acquires progress of a plurality of processes for generating print products;
a subdivision progress acquirer that acquires, in at least one of the plurality of processes, progress of subdivided processes obtained by subdividing the process;
a process display that displays the plurality of processes on a display device so that at least one of the processes being executed is distinguishable; and
a subdivided process display that displays the subdivided processes on the display device so that at least one of the subdivided processes being executed is distinguishable.

2. The display control device according to claim 1, wherein
the process display displays the processes being executed in a distinguishable manner in regions corresponding to the plurality of processes, and
the subdivided process display displays the subdivided process being executed in a distinguishable manner in subdivided regions obtained by subdividing the regions.

3. The display control device according to claim 2, wherein
the subdivided process display displays in the subdivided regions graphics which correspond to the subdivided processes and which indicate whether the subdivided processes are being executed.

4. The display control device according to claim 3, wherein
the print data indicating the print products is stored in a storage medium included in a server connected to a print device via a network, and
the graphics corresponding to the subdivided processes correspond to a process during transmission of the print data from the storage medium to the print device, a process of completion of transmission of the print data, a process during image processing based on the print data in the print device, and a process of completion of the image processing.

5. The display control device according to claim 3, wherein
the subdivided process display changes a form of the graphics depending on whether the subdivided processes are being executed.

6. The display control device according to claim 3, wherein
the subdivided process display displays accompanying information of the subdivided processes corresponding to the graphics by means of tooltips.

7. The display control device according to claim 1, wherein
at least one of the process display and the subdivided process display displays, when an error occurs in one of the processes, information indicating an error associated with the process.

8. The display control device according to claim 1, wherein
at least one of the process display and the subdivided process display displays, when an event associated with one of the processes occurs, information indicating an event associated with the process.

9. The display control device according to claim 1, wherein
the subdivided process display displays an elapsed time since a start of the subdivided process being executed.

10. The display control device according to claim 1, wherein
the process display displays the number of copies of the print products to be printed by the process being executed.

11. The display control device according to claim 1, wherein
the subdivided process display displays the number of copies of the print products to be printed by the subdivided process being executed.

12. The display control device according to claim 1, wherein
the subdivided process display displays the subdivided processes obtained by subdividing one of the processes, when prescribed display conditions are satisfied.

13. The display control device according to claim 1, wherein
the print data indicating the print products is stored in a storage medium included in a server connected to a print device via a network,
a process of waiting for a start of printing based on the print data is subdivided into a plurality of the subdivided processes, and
the subdivided processes includes a process associated with transmission of the print data from the storage medium to the print device and a process associated with image processing based on the print data in the print device.

14. The display control device according to claim 13, wherein
the process associated with transmission of the print data includes a process of issuing a print instruction for causing the print device to execute printing and a process of storing the print data stored in the storage medium in a prescribed storage location of the storage medium included in the print device, and
the process associated with image processing includes a process of starting capturing of the print data by an image processing program executed by the print device and a process of completing capturing of the print data.

15. The display control device according to claim 1, wherein
the plurality of processes include a process of waiting for a setting of print conditions, a process of adjusting colors of the print products, a print-in-progress process, and a print completion process.

16. A display control method, comprising:
acquiring progress of a plurality of processes for generating print products;
acquiring, in at least one of the plurality of processes, progress of subdivided processes obtained by subdividing the process;
displaying the plurality of processes on a display device so that at least one of the processes being executed is distinguishable; and displaying the subdivided processes on the display device so that at least one of the subdivided processes being executed is distinguishable.

17. A non-transitory computer-readable storage medium storing a display control program that causes a computer to function as:
- a progress acquirer that acquires progress of a plurality of processes for generating print products;
- a subdivision progress acquirer that acquires, in at least one of the plurality of processes, progress of subdivided processes obtained by subdividing the process;
- a process display that displays the plurality of processes on a display device so that at least one of the processes being executed is distinguishable; and
- a subdivided process display that displays the subdivided processes on the display device so that at least one of the subdivided processes being executed is distinguishable.

* * * * *